(12) United States Patent
Bae et al.

(10) Patent No.: US 7,325,683 B2
(45) Date of Patent: Feb. 5, 2008

(54) WELDING WIRE CONTAINER

(75) Inventors: Hyo-Young Bae, Pohang-si (KR); Sung-Wook Ha, Kyungsangbook-do (KR)

(73) Assignee: Hyundai Welding Co., Ltd. (KR)

(*) Notice: Subject to any disclaimer, the term of this patent is extended or adjusted under 35 U.S.C. 154(b) by 357 days.

(21) Appl. No.: 10/518,451

(22) PCT Filed: Jun. 22, 2002

(86) PCT No.: PCT/KR02/01186

§ 371 (c)(1),
(2), (4) Date: Dec. 20, 2004

(87) PCT Pub. No.: WO04/000499

PCT Pub. Date: Dec. 31, 2003

(65) Prior Publication Data

US 2005/0224381 A1    Oct. 13, 2005

(51) Int. Cl.
*B65D 85/67* (2006.01)
(52) U.S. Cl. ............... 206/397; 206/409; 220/636; 229/4.5; 229/5.7; 242/137; 242/588.4; 242/588.6
(58) Field of Classification Search ......... 206/389, 206/395, 397, 407–409; 220/611, 612, 615, 220/616, 622, 625, 634–636, 646; 229/4.5, 229/5.5, 5.7, 93, 122.3, 122.31; 242/170–174, 242/129, 134, 137, 588.4, 588.6
See application file for complete search history.

(56) References Cited

U.S. PATENT DOCUMENTS

| | | | | | |
|---|---|---|---|---|---|
| 2,568,284 | A | * | 9/1951 | Harrison | 229/5.5 |
| 2,640,524 | A | * | 6/1953 | Carpenter | 229/5.7 |
| 2,775,385 | A | * | 12/1956 | Gibbs, Jr. | 229/5.5 |
| 2,819,007 | A | * | 1/1958 | Bergstrom | 229/5.5 |
| 4,289,265 | A | * | 9/1981 | Ellerbrock | 229/5.5 |
| 4,741,453 | A | * | 5/1988 | Stolzman | 229/5.7 |
| 6,047,846 | A | * | 4/2000 | Watson | 220/601 |
| 2004/0211694 | A1 | * | 10/2004 | Coon et al. | 206/407 |

FOREIGN PATENT DOCUMENTS

JP       55-30312 A    3/1980

(Continued)

*Primary Examiner*—Luan K Bui
(74) *Attorney, Agent, or Firm*—The Webb Law Firm, P.C.

(57) ABSTRACT

A large capacity welding wire container for storing welding wire, in which an outer shell, an inner shell, a base plate and upper and lower fixtures are mostly made of paper as well as application of steel is minimized so that the container is readily discarded after exhaustion and coupled/disassembled, and a welding wire package using the same. The welding wire container comprises: an upper protrusion enlarged in diameter beyond the outer shell for structurally reinforcing an upper outer portion of the outer shell; a lid sized for covering the outer shell; and an upper fixture for fixing and wrapping the lid at an upper end of the outer shell to obtain structural reinforcement, wherein the upper fixture includes a flange extending inward along an outer edge of the lid, a supporting face folded from the flange and extending along an outer periphery of the upper protrusion and a folded groove arranged under the supporting face and having a diameter smaller than that of the upper protrusion.

17 Claims, 36 Drawing Sheets

FOREIGN PATENT DOCUMENTS

| | | |
|---|---|---|
| JP | 60-82276 A | 5/1985 |
| JP | 7-136763 A | 5/1995 |
| JP | 11-192552 A | 7/1999 |
| KR | 1991-0005819 | 8/1991 |
| KR | 100297164 B1 | 5/2001 |
| KR | 20-0228147 | 6/2001 |
| KR | 2001-0103852 A | 11/2001 |

* cited by examiner

200(300,400,500)

200(300,400,500)

200(300,400,500)

200(300,400,500)

WELDING WIRE CONTAINER

TECHNICAL FIELD

The present invention relates to a large capacity welding wire container for storing welding wire. More particularly, the present invention relates to a welding wire container in which an outer shell, an inner shell, a base plate and upper and lower fixtures are mostly made of paper. In addition the use of steel is minimized so that the container is readily disposable after exhaustion and coupled/disassembled. The invention also is directed to a welding wire package using the aboved-described container.

BACKGROUND ART

As shown in FIG. 1, a conventional welding wire container 100 includes a cylindrical outer shell 110 made of paper sheets stacked into several layers, a circular plywood base plate 120 fitted into a lower opening of the outer shell 110 and upper and lower seam-welded steel fixtures 130a and 130b fitted around the upper and lower ends of the outer shell 110.

An upper end of the outer shell 110 is rolled down into the outer shell 110 by using the upper seam-welded steel fixture 130a, and a lower end of the outer shell 110 is rolled up into the outer shell 110 by using the lower seam-welded steel fixture 130b to form a fitting projection 132 so that the circular base plate 120 may not slip downward. Also the conventional welding wire container 100 includes an inner shell 140 within the outer shell 110. A steel disk 142 is pushed into a lower opening of the inner shell 140, and bonded thereto via a high-strength adhesive. Then the steel disk 142 has been bonded to the circular base plate 120 via the high-strength adhesive or coupled to the circular base 120 via a bolt 144a and a net 144b so as to fix the inner shell 140.

A lid 150 is mounted on the upper fixture 130a in the upper end of the outer shell 110 while wrapping the upper end of the fixture 130a therein. The container includes a ring member 160 for wrapping an outer periphery of the lid 150 to securely fix the lid 150 to the upper fixture 130a. The ring member 160 has a clamp 162 for fixing both ends thereof.

However, the conventional container 100 is disadvantageously complicated in manufacture. Further, in discarding any exhausted container, the container is not disassembled. In particular, it is further troublesome since the welding wire container 100 is in the form of a large capacity vessel. That is to say, when the exhausted container 100 is stored for a certain time period before discarded, the container 100 occupies a large area of storage site since it has a large capacity. Further, transportation of the conventional container 100 always confronts a problem of excessive transportation cost.

Since the conventional container 100 is rarely disassembled in discard, container 100 is mostly incinerated and only remaining steel portions are retreated. Treatment efficiency is very poor since even a large-sized incinerator can treat only 1 or 2 containers. Sometimes, a weight is hung on a large crane to compress the container 100 and reduce the volume thereof before incinerating the container 100. However, the adhesive sticking to the inner shell 140 of the container and so on releases poisonous gas and smoke during incineration thereby inducing air pollution as a problem.

Of course, though the container 100 can be collected and reused, collection and reuse are not practical since it is expensive to collect empty containers and the used containers may have been damaged in use or contain moisture inadequate for reuse. Although some containers are clean in appearance, they are rarely reused owing to doubtful strength and so on.

SUMMARY OF THE INVENTION

Accordingly the present invention has been made to solve the foregoing problems of the prior art. It is therefore an object of the present invention to provide a welding wire container in which an outer shell, an inner shell, a base plate and upper and lower fixtures are mostly made of paper as well as application of steel is minimized so that the container is readily discarded after exhaustion, and a welding wire package using the same.

It is another object of the present invention to provide a welding wire container in which an outer shell, an inner shell, a base plate and upper and lower fixtures constituting the container are readily coupled/disassembled, and a welding wire package using the same.

BRIEF DESCRIPTION OF THE DRAWINGS

FIGS. 2a and 2b illustrate a structure of a welding wire container according to the first embodiment of the invention, in which FIG. 2a is a partially broken perspective view thereof, and FIG. 2b is a partially broken sectional view thereof;

FIGS. 3a and 3b illustrate an alternative structure of a welding wire container according to the first embodiment of the invention, in which FIG. 3a is a partially broken perspective view thereof, and FIG. 3b is a partially broken sectional view thereof;

FIGS. 6a and 6b illustrate a welding wire container according to a second embodiment of the invention, in which FIG. 6a is a partially broken perspective view thereof, and FIG. 6b is a partially broken sectional view thereof;

FIGS. 15a and 15b illustrate a transport jig for transporting a container of the invention, in which FIG. 15a is an exterior perspective view thereof, and FIG. 15b is a sectional view thereof in use;

FIGS. 16a and 16b illustrate an alternative transport jig for transporting the container of the invention, in which FIG. 16a is an exterior perspective view thereof, and FIG. 16b is a sectional view thereof in use;

FIG. 18b is a sectional view magnifying a coupling status of an upper fixture, a lid and a ring member in the welding wire container shown in FIG. 18a;

FIGS. 19a and 19b illustrate another alternative upper and lower fixtures equipped in the welding wire container according to the fourth embodiment of the invention, in which FIG. 19a shows the upper fixture, and FIG. 19b shows the lower fixture;

FIGS. 20a to 20d illustrate further another upper and lower fixtures equipped in the welding wire container according to the fourth embodiment of the invention, in which FIG. 20a is a perspective view of the upper fixture, FIG. 20b is a sectional view of a clamping means, FIG. 20c is a plan sectional view of the clamping means, and FIG. 20d is a perspective view of the lower fixture;

FIGS. 24a to 24d illustrate several alternative cross sections of the welding wire container of the invention, in which FIG. 24a is a plan view having a quadrangular cross section, FIG. 24b is a plan view having a pentagonal cross section, FIG. 24c is a plan view having a hexagonal cross section, and FIG. 24d is a plan view having an octagonal cross section.

DETAILED DESCRIPTION OF THE INVENTION

Figure 1:
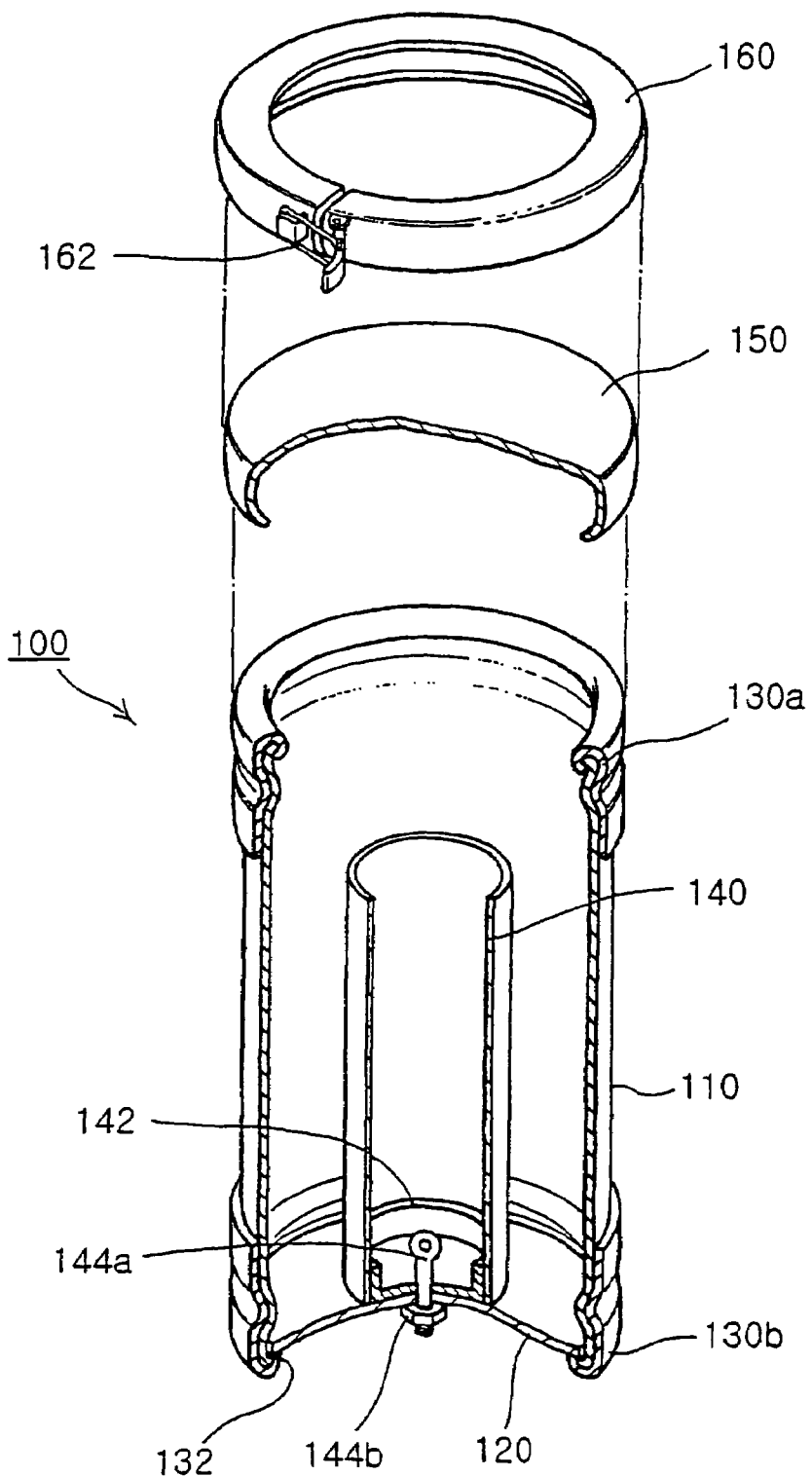
FIG. 1 is a partially broken perspective view of a welding wire container of the prior art.

According to a first aspect of the invention to obtain the foregoing objects, it is provided a welding wire container which includes an outer shell for storing welding wire therein and a base plate for closing a lower end of the outer shell, the welding wire container comprising: an upper protrusion enlarged in diameter beyond the outer shell for structurally reinforcing an upper outer portion of the outer shell; a lid sized for covering the outer shell; and an upper fixture for fixing and wrapping the lid at an upper end of the outer shell to obtain structural reinforcement, wherein the upper fixture includes a flange extending inward along an outer edge of the lid, a supporting face folded from the flange and extending along an outer periphery of the upper protrusion and a folded groove arranged under the supporting face and having a diameter smaller than that of the upper protrusion.

According to a second aspect of the invention to obtain the foregoing objects, a welding wire container is provided which includes an outer shell for storing welding wire therein, a base plate for closing a lower end of the outer shell and a lid for covering the outer shell, the welding wire container comprising: a fitting projection arranged in a lower inner portion of the outer shell and having a diameter smaller than that of the base plate for catching and supporting the base plate thereon; and a lower fixture for wrapping the lower end of the outer shell to structurally reinforce the same, wherein the lower fixture includes a flange extending along a lower edge of the outer shell and a supporting face folded from the flange and extending along a lower outer periphery of the outer shell.

According to a third aspect of the invention to obtain the foregoing objects, a welding wire container is provided which includes an outer shell for storing welding wire therein and a base plate for closing a lower end of the outer shell, the welding wire container comprising: an upper protrusion enlarged in diameter beyond the outer shell for structurally reinforcing an upper outer portion of the outer shell; a lid sized for covering the outer shell; an upper fixture for fixing and wrapping the lid at an upper end of the outer shell to obtain structural reinforcement, wherein the upper fixture includes a flange extending inward along an outer edge of the lid, a supporting face folded from the flange and extending along an outer periphery of the upper protrusion and a folded groove arranged under the supporting face and having a diameter smaller than that of the upper protrusion; a fitting projection arranged in a lower inner portion of the outer shell and having a diameter smaller than that of the base plate for catching and supporting the base plate thereon; and a lower fixture for wrapping the lower end of the outer shell to structurally reinforce the same, wherein the lower fixture includes a flange extending along a lower edge of the outer shell and a supporting face folded from the flange and extending along a lower outer periphery of the outer shell.

According to a fourth aspect of the invention to obtain the foregoing objects, it is provided a welding wire container which includes an outer shell for storing welding wire therein and a base plate for closing a lower end of the outer shell, the welding wire container comprising: upper and lower fixtures fitted around respectively upper and lower portions of the outer shell, wherein the upper fixture has a flange extended for a length substantially identical with the thickness of the outer shell, and the lower fixture has a flange extended for catching the base plate thereon; and clamping means at both ends of the upper and lower fixtures, wherein the clamping means are detachably tightened so that the outer shell maintains its original shape and couples with the base plate, and the clamping means are tightened and loosed so that the outer shell, the base plate and the upper and lower fixtures are readily coupled and disassembled.

Furthermore the invention provides a welding wire package comprising: the welding wire container for storing welding wire stacked therein in accordance with one of the preceding aspects.

The following detailed description will discuss the welding wire containers of the present invention easy in coupling and/or disassembly in reference to the accompanying drawings.

Figure 2A:
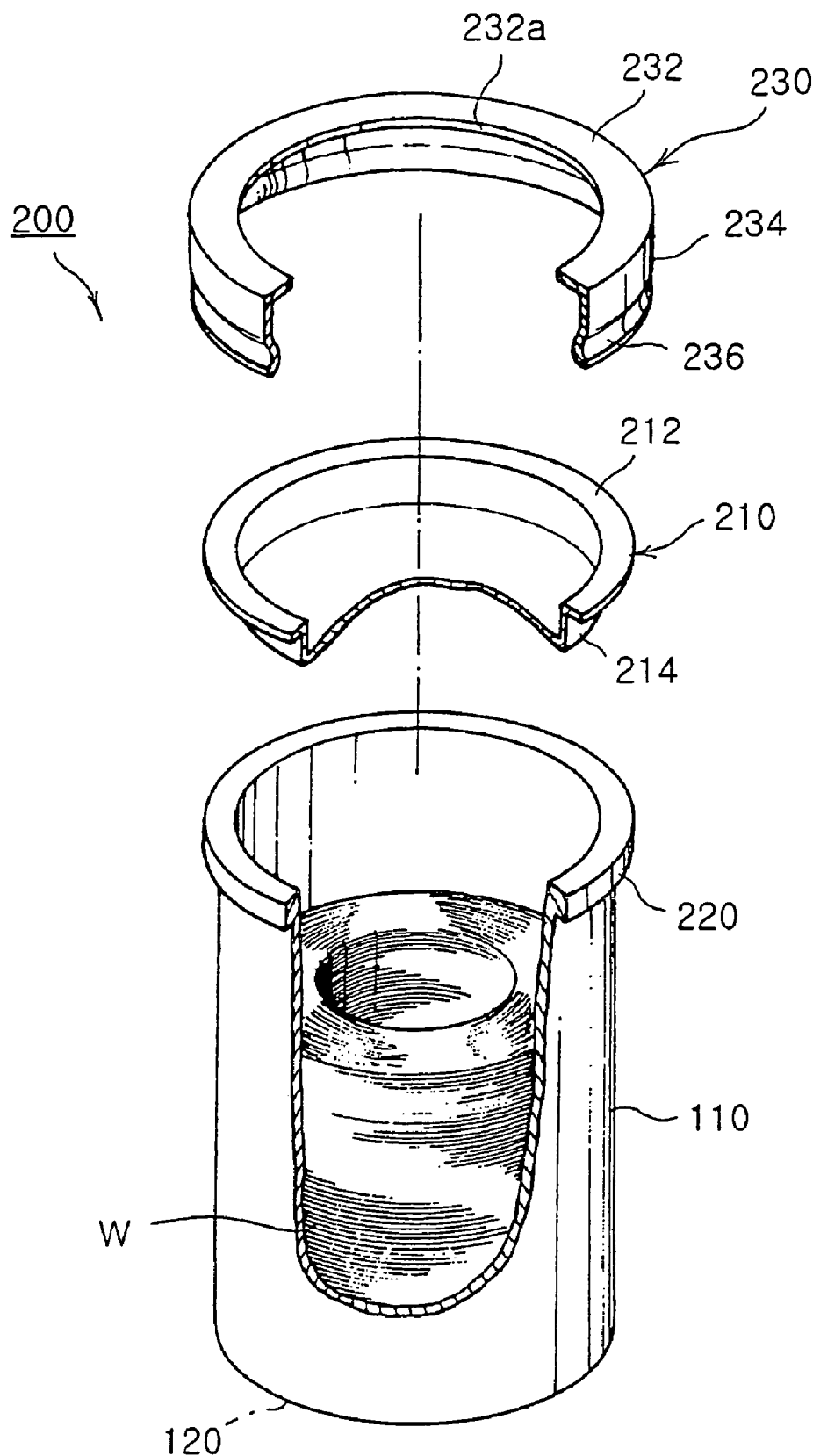
Figure 2B:
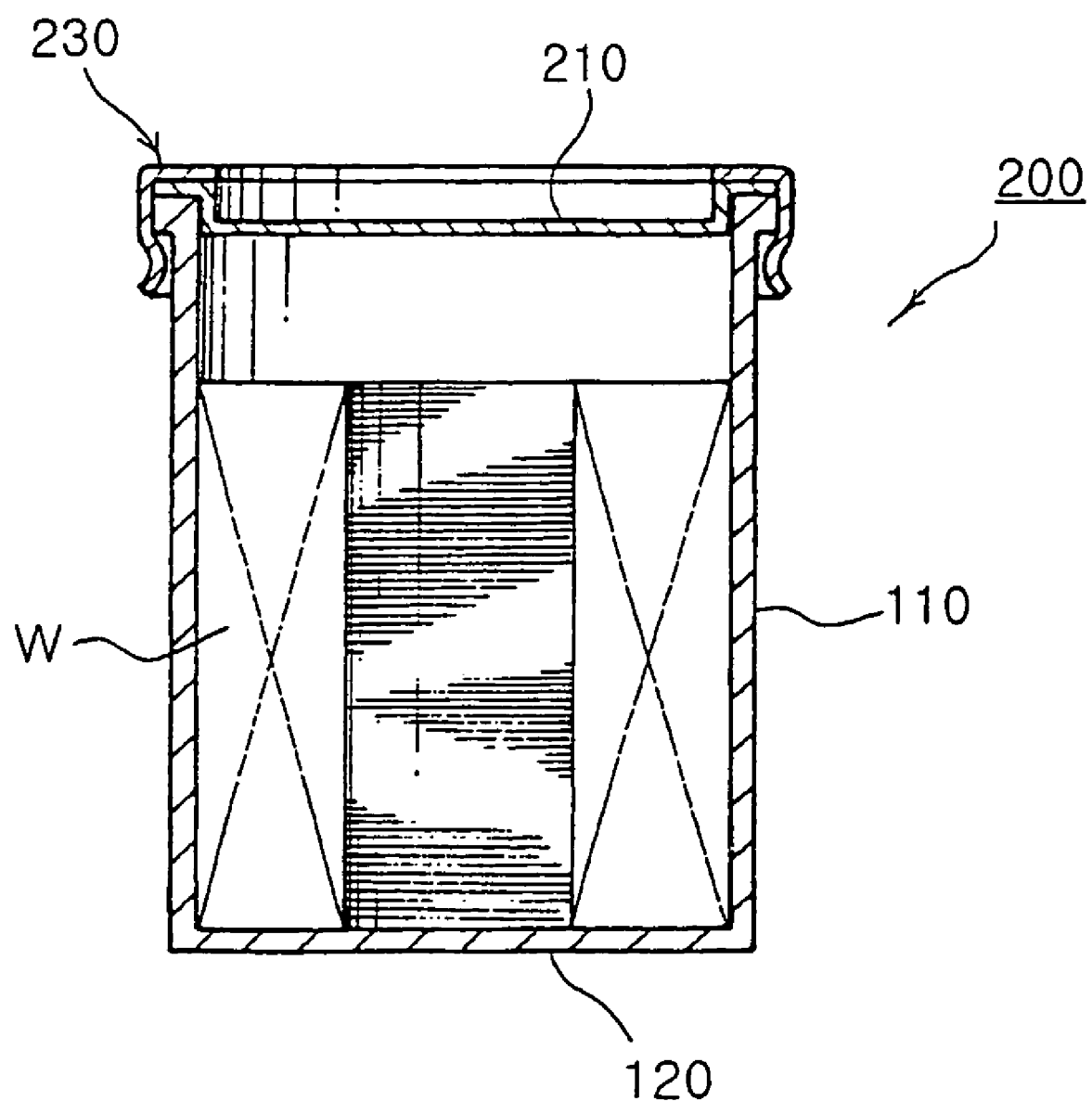

As shown in FIG. 2, the welding wire container 200 according to the first embodiment of the invention includes an outer shell 110 for storing welding wire W therein, a base plate 120 and a lid 210 covering an upper portion of the outer shell 110.

In an upper end thereof, the outer shell 110 has an upper protrusion 220 enlarged in diameter beyond the diameter of the outer shell 110 in order to structurally reinforce the upper exterior of the outer shell 110.

Figure 5A:
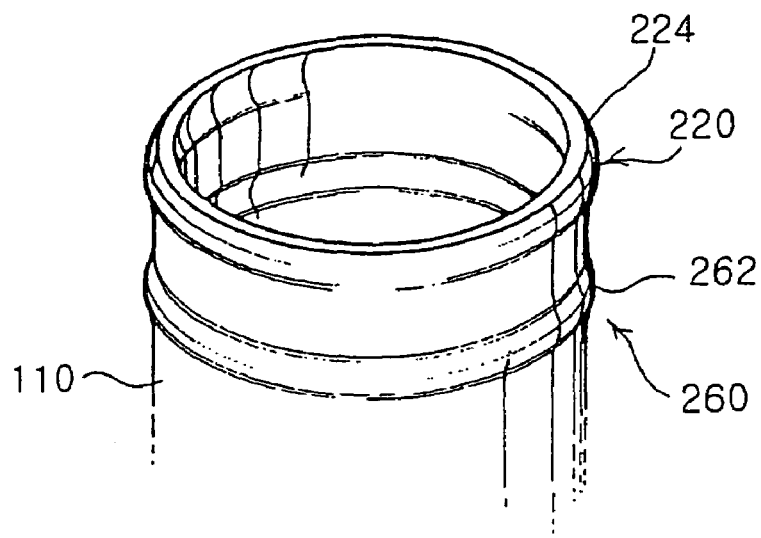
FIGS. 5a to 5c are perspective views of examples of upper and outer protrusions equipped in the welding wire container according to the first embodiment of the invention.
Figure 5B:
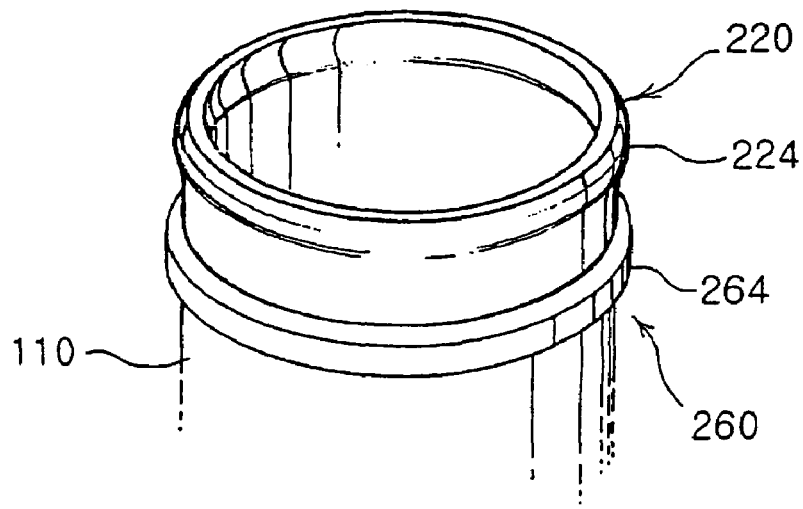
Figure 5C:
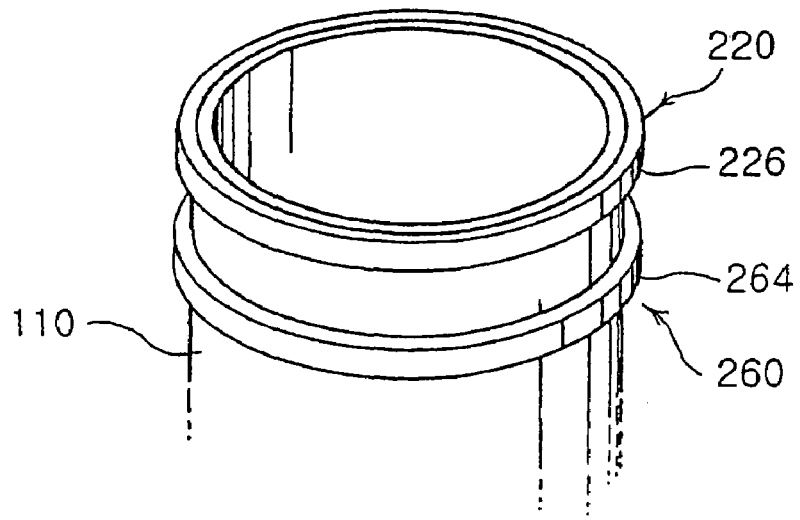

The upper protrusion 220 is made of paper. The upper protrusion 220 has a folded portion 224 enlarged in diameter beyond the outer shell 110 as shown in FIGS. 5a and 5b. Alternatively, as shown in FIG. 5c, the upper protrusion 220 has a ring member 226 enlarged in diameter, which is fitted around the outer shell 110 and fixedly bonded thereto.

Figure 3A:
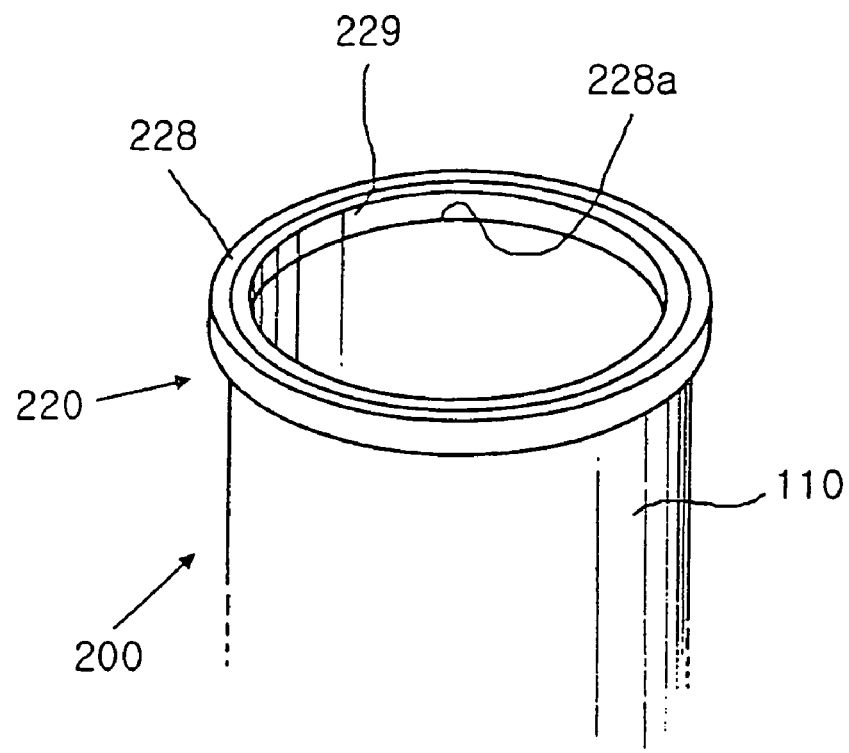
Figure 3B:
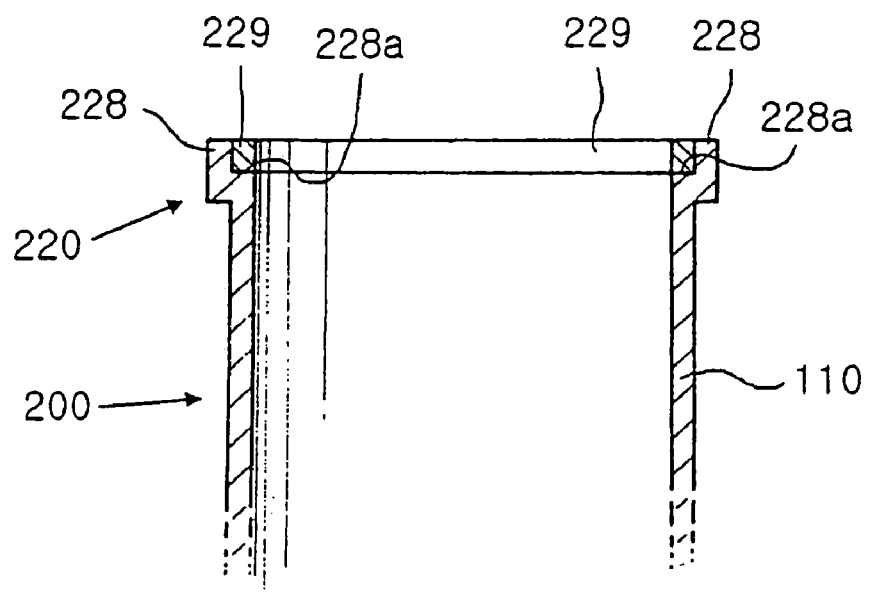

As shown in FIGS. 3a and 3b, the upper protrusion 220 includes an enlarged portion 228 enlarged in diameter at an upper edge of the outer shell 110 and a ring member 229 seated on and bonded to an inner edge 228a of the enlarged portion 228, in which the ring member 229 has an inside diameter substantially identical with that of the outer shell 110.

Further, the first embodiment of the invention has the lid 210 made of paper and sized to cover the outer shell 110 as shown in FIG. 2. The lid 210 has a flange 212 contacting with the upper edge of the outer shell 110 and a stepped portion 214 projecting downward into the outer shell 110 to support an upper inner periphery of the outer shell 110.

In the lid 210 having this configuration, the flange 212 is closely contacted with the upper edge of the outer shell 110 by an upper fixture 230 which will be described hereinafter, and the stepped portion 214 having a diameter smaller than that of the flange 212 is fitted into an upper inner periphery of the outer shell 110 to function as a reinforcing member resisting external force which is applied to the upper edge of the outer shell 110. At the same time, the lid 210 also functions to seal the inside of the outer shell 110 so that external air may not be introduced into the inside.

The first embodiment of the invention also has the upper fixture 230 in the upper end of the outer shell 110 for fixing and wrapping the lid 210 to structurally reinforce the lid 210. The fixture 230 is made of paper like the outer shell 110, the lid 210 and the upper protrusion 220. Also the fixture 230 has a flange 232 extending inward along an outer edge of the flange 212 of the lid 210, a supporting face 234 folded from the flange 232 and extending along an outer periphery of the upper protrusion 220 and a folded groove 236 extending downward from the supporting face 234. The folded groove 236 has a diameter which is reduced smaller than that of the upper protrusion 220.

Figure 14:
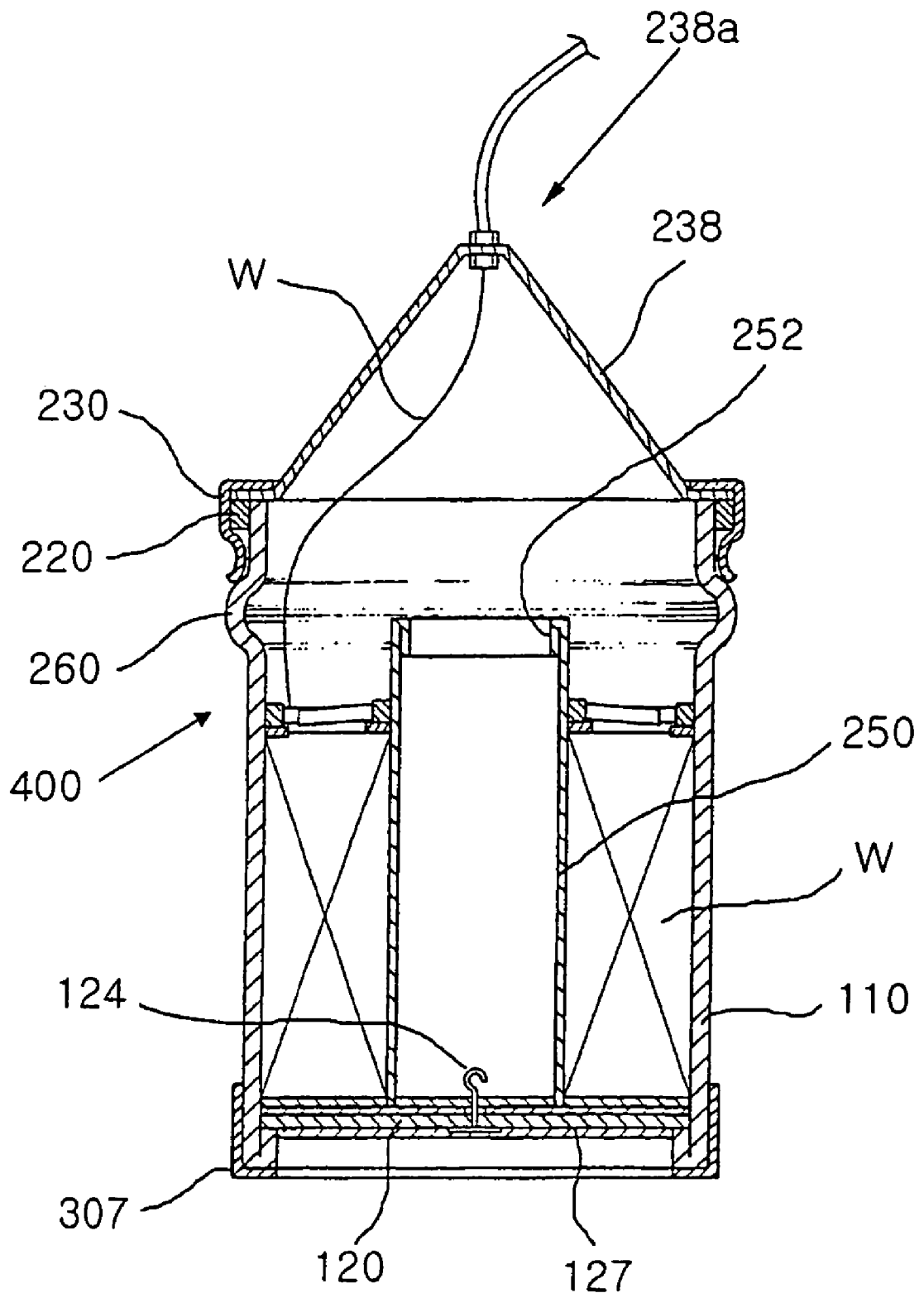
FIG. 14 is a sectional view of the welding wire container in use according to the third embodiment of the invention.

Further, as shown in cross section in FIG. 14, the flange 232 of the upper fixture 230 includes a central inner periphery 232a which is so sized to fix a head cap 238 for drawing out the welding wire so that the welding wire W can be drawn out when the lid 210 is removed, the head cap 238 is mounted, and the upper fixture 230 is mounted again.

Figure 4:
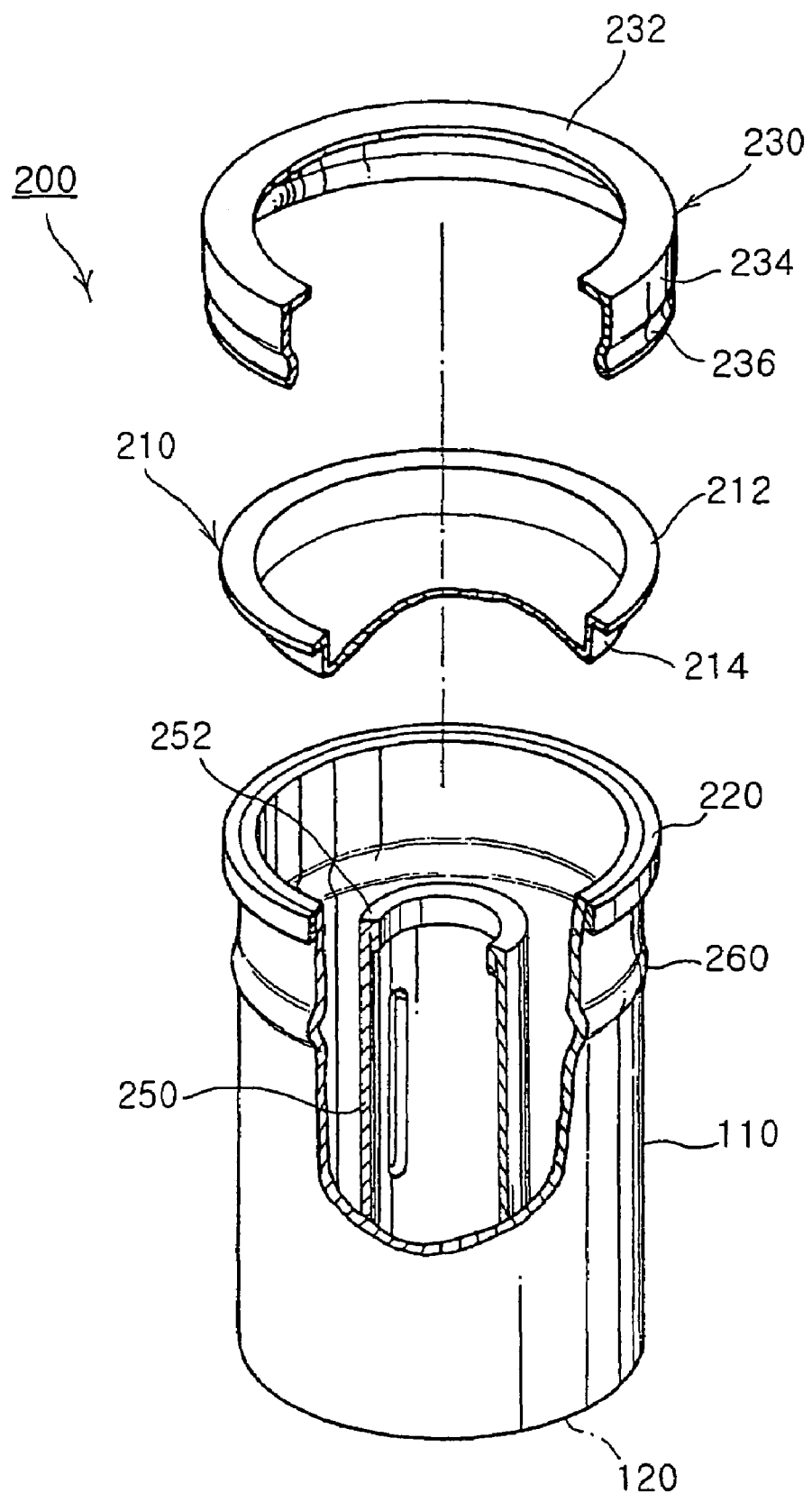
FIG. 4 is a partially broken perspective view of the welding wire container having an inner shell installed therein according to the first embodiment of the invention.

As shown in FIG. 4, an inner shell 250 is placed in a central portion of the outer shell 110. The inner shell 250 is coaxially fixed at a lower end to the base plate 120, and has an upper end folded inward to form a folded portion 252 for structurally reinforcing the upper end of the inner shell 250.

Further, as shown in FIGS. 4 and 5, the outer shell 110 includes an outer protrusion 260 enlarged in diameter adjacent to the lower end of the upper fixture 230. The outer protrusion 260 has a folded portion 262 enlarged in diameter from the outer shell 110 adjacent to the lower end of the fixture 230. The folded portion 262 can be integrally formed together with the outer shell 110, and adds structural strength to the outer shell 110 to protect the outer shell 110 against any external force. The folded portion 262 may have the form of a continuous ring around the outer shell 110. Alternatively, the folded portion 262 may include a number of small arciform folded portions which continue along an outer periphery of the outer shell 110.

Further, a ring member 264 enlarged in diameter can be fitted around the outer shell 110 adjacent to the lower end of the upper fixture 230 and fixedly bonded thereto to form the outer shell 260.

In this case, the ring member 264 can be made of paper, and adds structural strength to the outer shell 110 to protect the outer shell 110 against any external force. Further, the ring member 264 can be separately made, and then readily mounted on the outer shell 110.

According to the first embodiment of the invention as above, the outer shell 110, the inner shell 250, the base plate 120 and the upper fixture 230 are mostly made of paper so that the container can be very easily discarded after exhaustion.

Figure 6A:
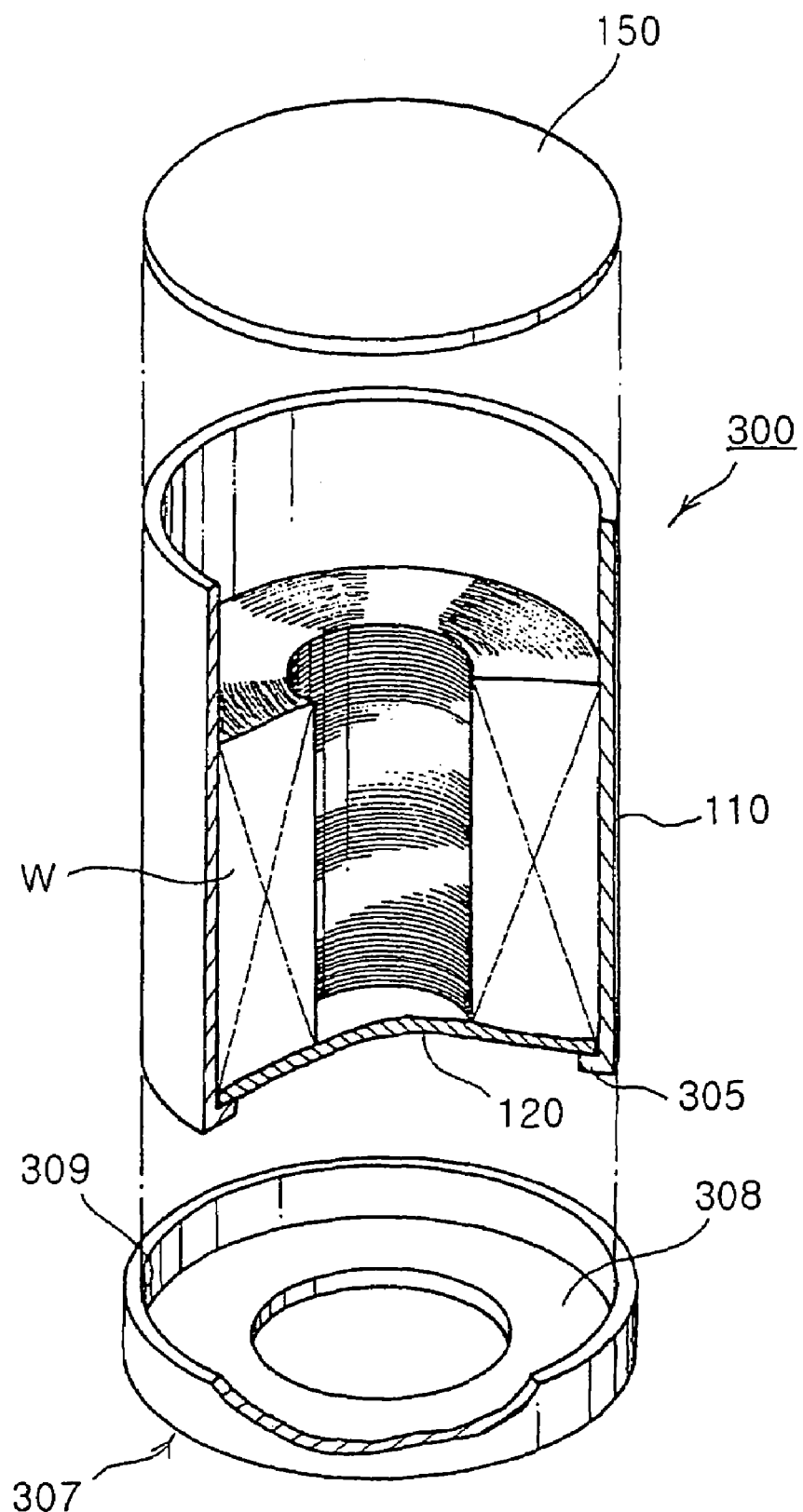
Figure 6B:
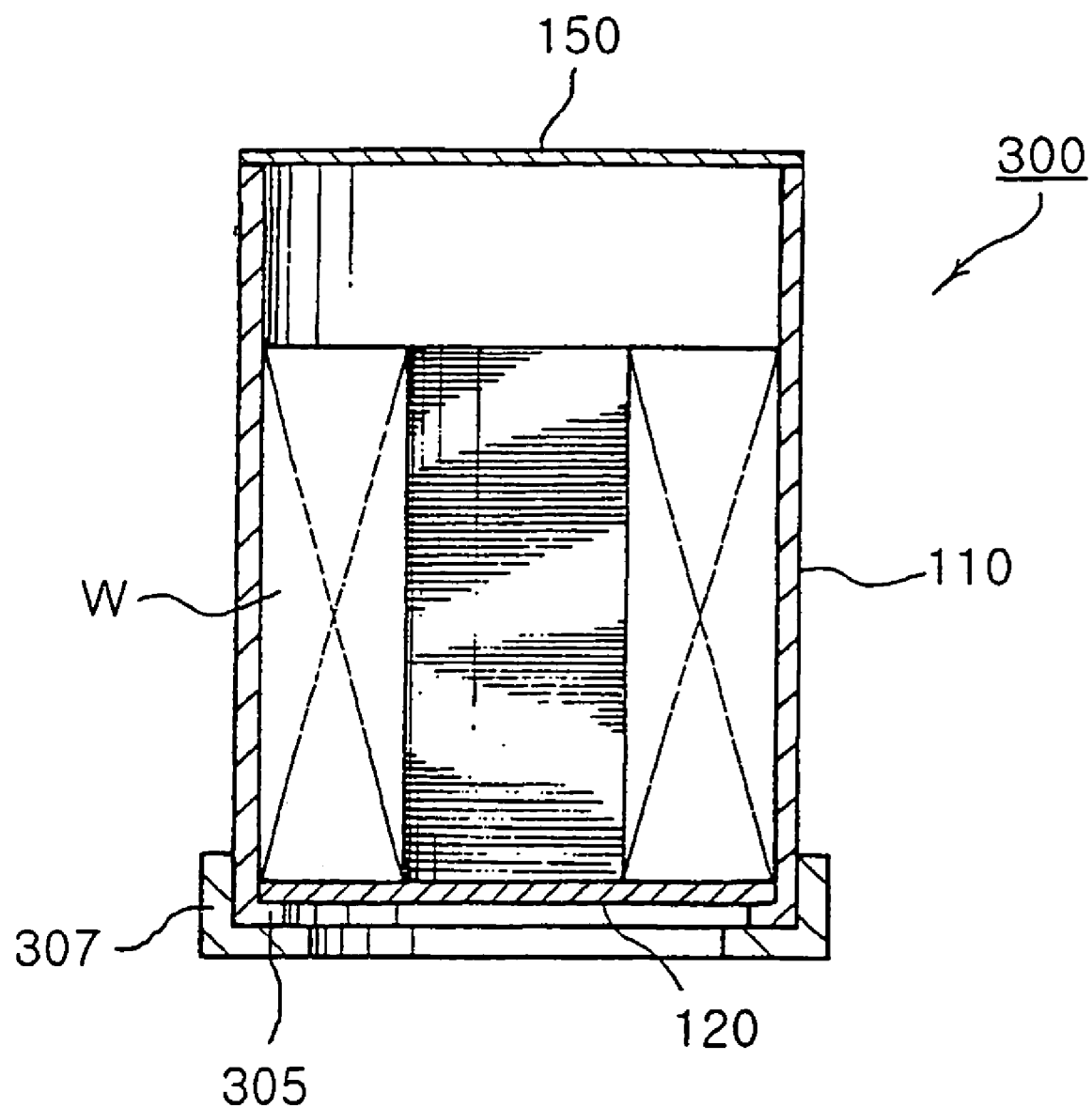

As shown in FIG. 6, the welding wire container 300 according to the second embodiment of the invention includes an outer shell 110 for storing welding wire W therein, a base plate 120 and a lid 150 for covering an upper portion of the outer shell 110.

The welding wire container 300 forms a fitting projection 305 projected inward at a lower end of the outer shell 110. The fitting projection 305 has a diameter substantially smaller than that of the base plate 120 so that the base plate 120 is supportedly caught on an upper portion of the fitting projection 305.

The fitting projection 305 has an integral construction with the lower end folded inward into an L-shaped configuration. The fitting projection 305 provided in the outer shell 110 in this fashion can mount the base plate 120 on the outer shell without any additional member.

Also, the welding wire container 300 according to the second embodiment of the invention includes a lower fixture 307 for wrapping a lower edge of the outer shell 110 to structurally reinforce the same. The lower fixture 307 has an annular flange 308 extending along the lower edge of the outer shell 110 and a supporting face 309 folded from the flange 308 and extending along a lower outer periphery of the outer shell 110 to further securely reinforce the lower end of the outer shell 110 against any external force.

Figure 7:
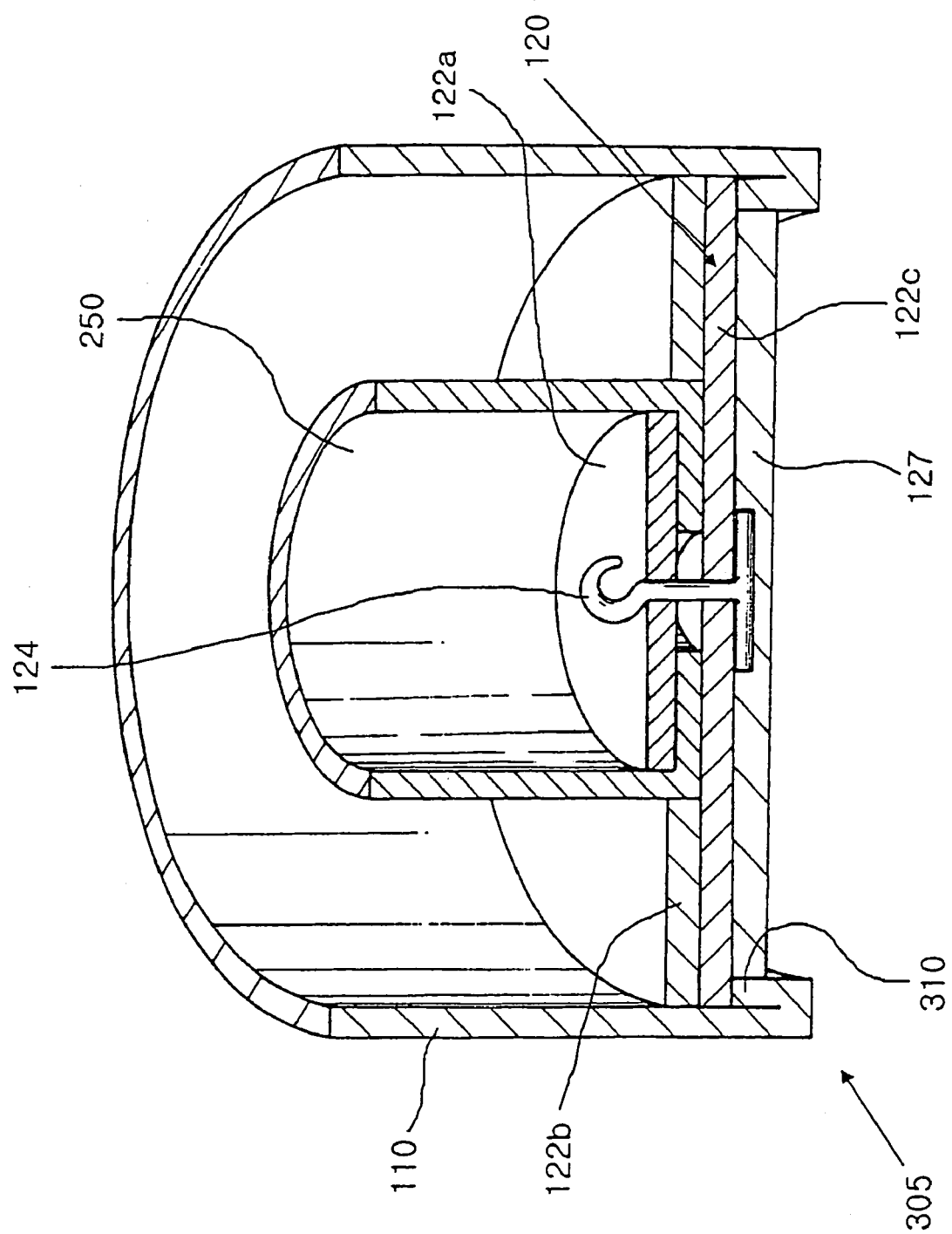
FIG. 7 is a partially broken perspective view illustrating the welding wire container having an inner shell installed therein according to the second embodiment of the invention.

Unlike the above construction, the fitting projection 305 has a lower end which is folded inward overlapping itself in part to define an integrally folded portion 310 as shown in FIG. 7. The fitting projection 305 provided in the outer shell 110 in this manner can mount the base plate 120 on the outer shell 110 without any additional member.

Figure 9A:
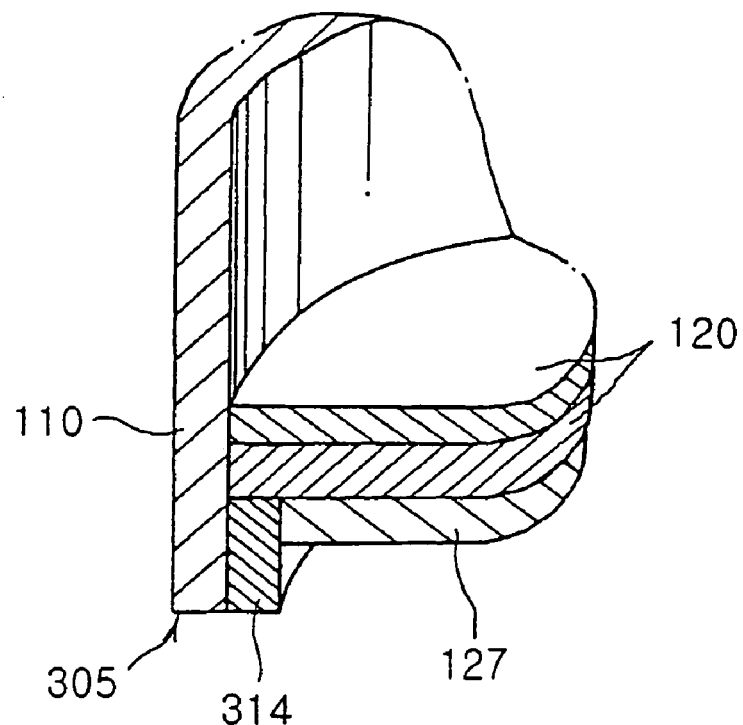
FIGS. 9a to 9c are perspective views of examples of the welding wire container according to the second embodiment of the invention.

Further, as shown in FIG. 9a, the fitting projection 305 has a construction which is obtained by fixedly bonding a ring member 314 having an outside diameter substantially the same as the inside diameter of the outer shell 110 to an inner lower end of the outer shell 110. The ring member 314 may be made of paper, and add structural strength to the outer shell 110 to protect the outer shell 110 against any external force. Further, the ring member 264 may be separately made and then readily mounted on the outer shell 110.

Figure 9B:
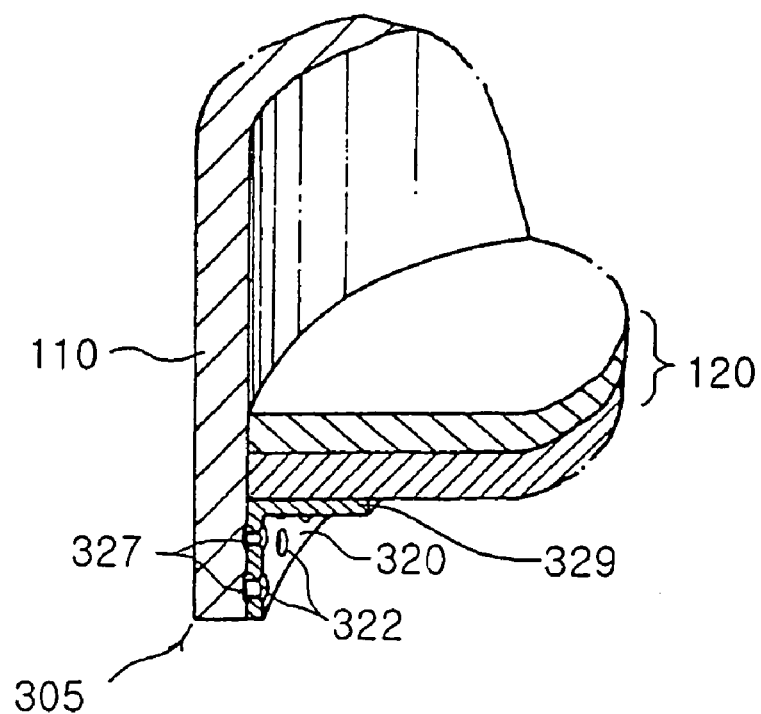

As shown in FIG. 9b, the fitting protrusion 305 may have a backing member 320 extending along a lower inner periphery of the outer shell 110. The backing member 320 has an outer vertical portion extending along the lower inner periphery of the outer shell 110 and a number of holes 322 are perforated from the inner face of the vertical portion toward the outer face thereof to form burrs 327 projecting from the vertical portion. The backing member 320 also has a flange 329 folded from the vertical portion to extend along an outer edge of the base 120.

Therefore, the vertical portion of the backing member 320 is tightly contacted against the lower inner periphery of the outer shell 110 so that the base plate 120 is supported by the flange 329.

In this case, the backing member 320 can be made of steel excellent in strength.

The number of burrs 327 in the outer face of the backing member 320 are compressed against the lower inner face of the outer shell 110 to further enhance the coupling force of the backing member 320 with the outer shell 110 thereby more stably supporting the base plate 120.

Figure 9C:
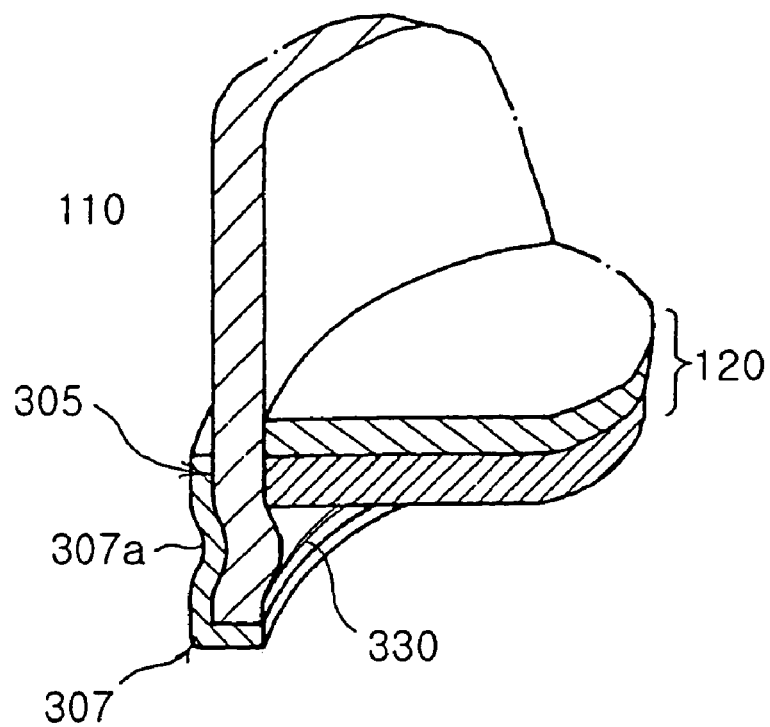

As shown in FIG. 9c, the fitting projection 305 can be defined by a folded portion 330 which is reduced in diameter adjacent to the lower end of the outer shell 110. The folded portion 330 can be integrally formed together with the outer shell 110, and add structural strength to the outer shell 110 to protect the outer shell 110 against any external force.

In this case, the lower fixture 307 has a folded portion 307a configured corresponding to the folded portion 330 for fixation to the lower end of the outer shell 110.

Figure 8:
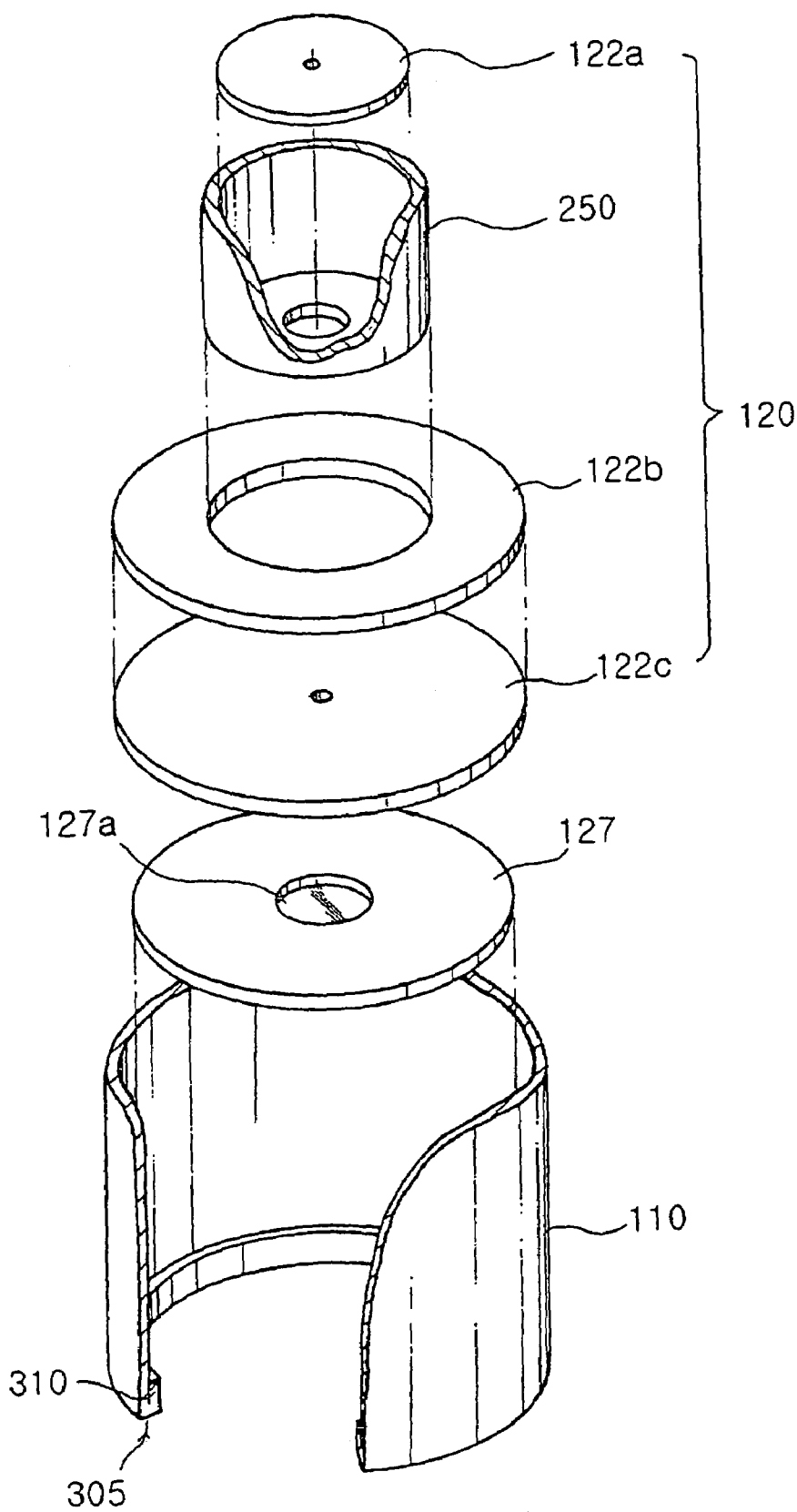
FIG. 8 is an exploded perspective view of the welding wire container having the inner shell installed therein according to the second embodiment of the invention.

As shown in FIGS. 7 and 8, the welding wire container 300 according to the second embodiment of the invention includes an inner shell 250 within the outer shell 110. The base plate 120 is configured to fix the lower end of the inner shell 250. The base plate 120 includes an upper circular plate 122a having a diameter substantially identical with the inside diameter of the inner shell 250, a doughnut-shaped intermediate plate 122b having an inside diameter substantially identical with the outside diameter of the inner shell 250 and an outside diameter substantially identical with the inside diameter of the outer shell 110 and a lower circular plate 122c having a diameter substantially identical with the inside diameter of the outer shell 110.

In the base plate 120 configured as above, the lower circular plate 122c is supported with its outer edge on the lower fitting projection 305 of the outer shell 110, the doughnut-shaped intermediate plate 122b is placed on the lower circular plate 122c, the inner shell 250 is inserted into the inside diameter of the intermediate plate 122b, and then the upper circular plate 122a is inserted into the inside diameter of the inside tube 250.

In this manner, the lower end of the inner shell 250 is fixedly fitted between the upper circular plate 122a and the doughnut-shaped intermediate plate 122b, in which the welding wire W is received and stacked in a space between the outer shell 110 and the inner shell 250.

The welding wire W received like this strongly presses the intermediate plate 122b and the lower circular plate 122c toward the fitting projection 305 under the self-weight to obtain tight contact therebetween.

The upper circular plate 122a, the doughnut-shaped intermediate plate 122b and the lower circular plate 122c can be so mounted that a hook 124 can project through central portions thereof into the inner shell 250. The hook 124, as shown in FIG. 15b, can be connected with a one-touch type rubber band 125 for fixing the welding wire W stacked between the outer shell 110 and the inner shell 250.

Further, as shown in FIGS. 7 and 8, the container includes a disk-shaped backing member 127 having an outside diameter identical with the inside diameter of the fitting projection 305 and functioning as an inner reinforcing member of the above mentioned fitting projection 305.

The backing member 127 supports the inner periphery of the fitting projection 305 with an outer edge thereof thereby further protecting the lower end of the outer shell 110 against any external force. Further, the backing member 127 has a recess 127a in an upper face thereof, where the hook 124 can be seated by its lower end.

Figure 10A:
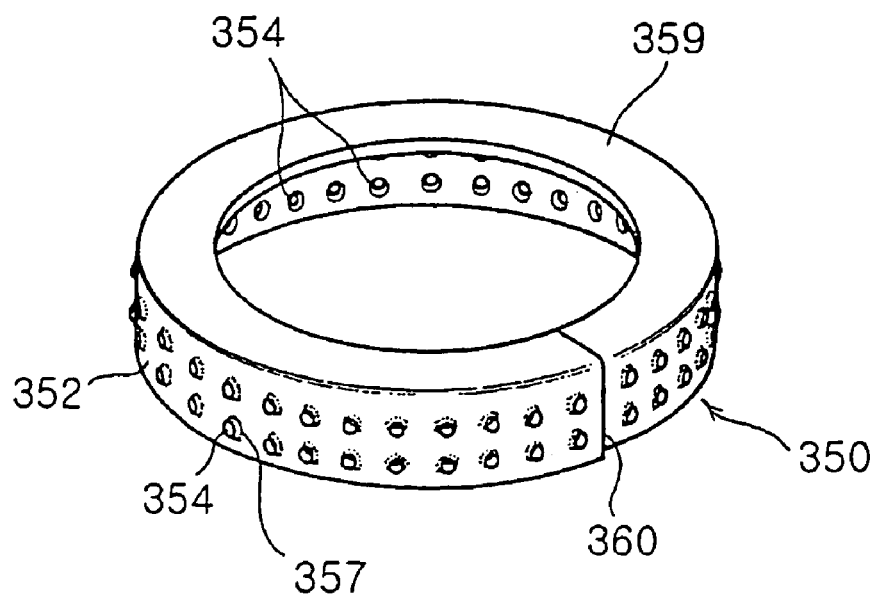
FIGS. 10a to 10c are perspective views of examples of the welding wire container having outside diameter-adjusting means according to the second embodiment of the invention.
Figure 10B:
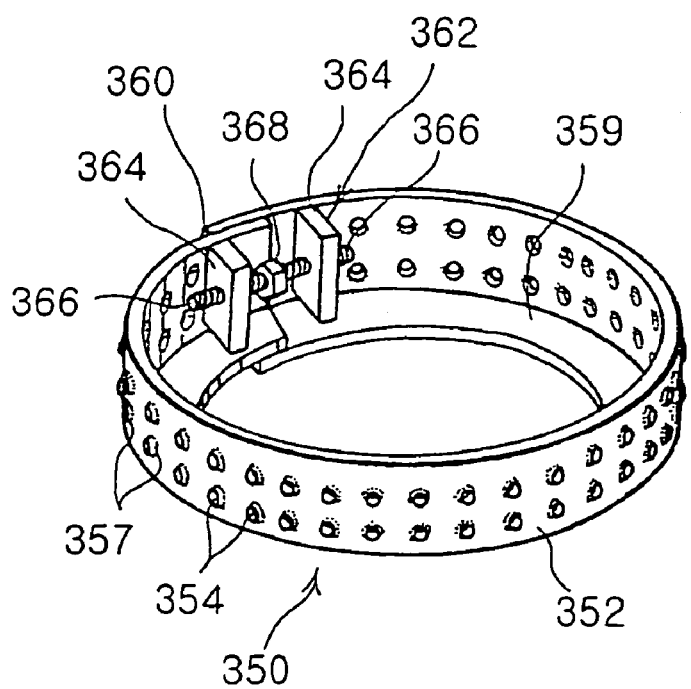
Figure 10C:
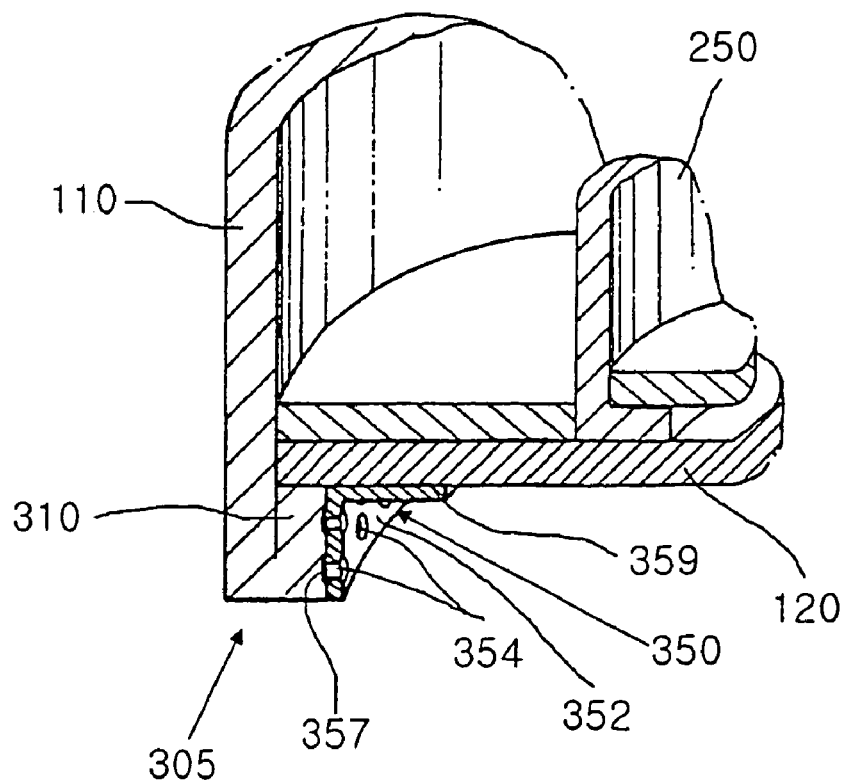

Now FIG. 10c shows another backing member 350 that is an inner reinforcing member of the above-described fitting projection 305.

In the fitting projection 305, the lower end of the outer shell 110 is folded inward overlapping itself in part to define the integrally folded portion 310. The backing member 350 is mounted on the inner face of the fitting projection 305. The backing member 350 has a body 352 extending along the inner periphery of the fitting projection 305. The body 352 has a number of holes 354 perforated toward the outer face from the inner face to form burrs 357 projected from outer face of the body 352. The backing member 350 includes a flange 359 which is folded from the body 352 and extends along the outer edge of the base plate 120. The body 352 and the flange 359 have cut sections 360 formed in a radial direction of the outer shell 110 and diameter-adjusting means 362 at both ends of the cut sections 360.

The outside diameter-adjusting means 362 includes nut members 364 mounted respectively on inner peripheries of the cut sections 360 of the body 352 and a bolt member 368 having male threads 366 at both ends for being screwed into the nut members 364 so as to adjust the diameter of the backing member 350 via rotation of the bolt member 368.

Therefore, the outside diameter-adjusting means 362 enlarges the outside diameter of the body 352 so that the outer periphery of the body 352 closely contacts with the lower inner periphery of the outer shell 110. Then the backing member 350 more securely supports the lower end of the outer shell 110 against any external force.

The backing member 350 is closely contacted with the lower inner periphery of the outer shell 110 by the outside diameter-adjusting means 362 to more securely support the lower end of the outer shell 110 against any external force while the number of burrs 357 in the body 352 are pressed against the inner periphery of the fitting projection 305 to more stably support the base plate 120.

Further, according to the second embodiment of the invention, the outer shell 110, the inner shell 250, the base plate 120 and the lower fixture 307 are mostly made of paper while only the backing plate 350 is made of steel in order to minimize application of, steel so that the container can be readily discarded after exhaustion.

Figure 11:
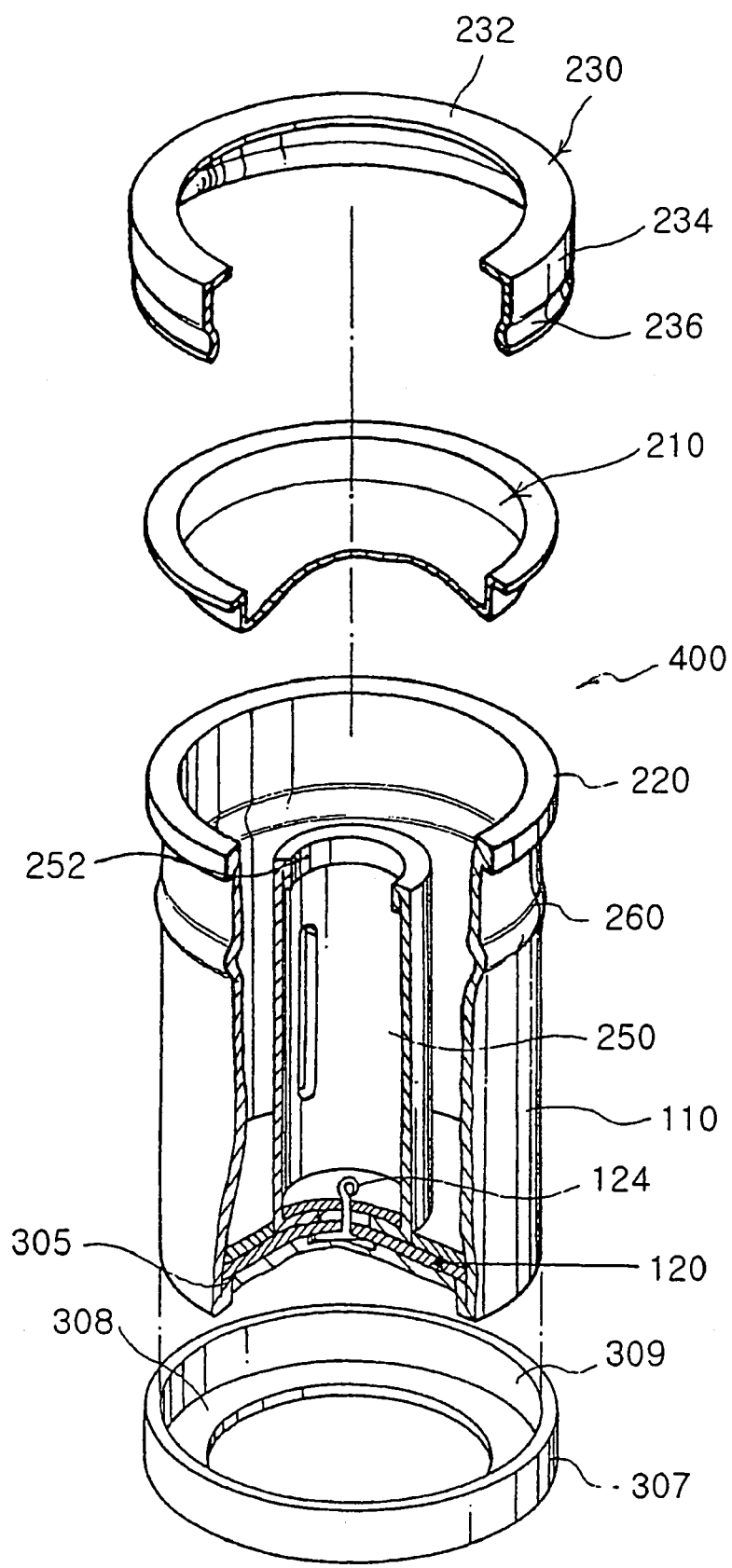
FIG. 11 is a partially broken perspective view of a welding wire container according to a third embodiment of the invention.
Figure 12:
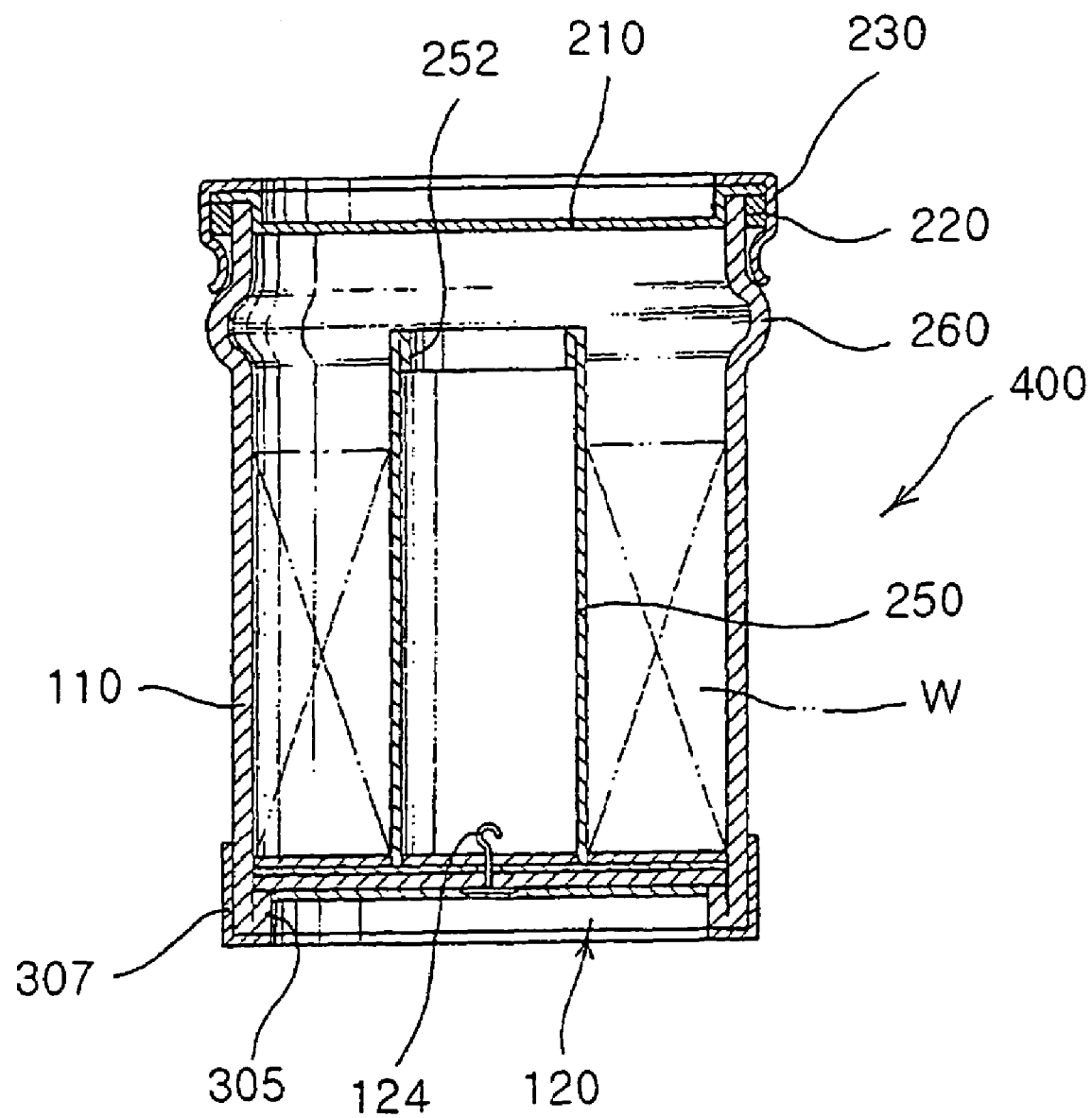
FIG. 12 is a sectional view of the welding wire container according to the third embodiment of the invention.

FIG. 11 shows the welding wire container 400 according to the third embodiment of the invention. The welding wire container 400 includes an outer shell 110 for storing welding wire W and a base plate 120 for closing a lower end of the outer shell 110. The outer shell 110 has an upper protrusion 220 in an upper exterior, which is enlarged in diameter beyond the outer shell 110 to structurally reinforce the outer shell 110. The container 400 includes a lid 210 at an upper portion of the outer shell 110, which is sized for covering the same, and an upper fixture 230 over the upper portion of the outer shell 110, which fixes and wraps the lid 210 for structurally reinforcing the same.

As in the first embodiment, the upper fixture 230 has a flange 232 extending along an outer edge of the lid 210, a supporting face 234 folded from the flange 232 and extending along an outer periphery of the upper protrusion 220 and a folded groove 236 in a lower portion of the supporting face 234. The folded groove 236 has a diameter smaller than that of the upper protrusion 22.

Further, the outer shell 110 has a fitting projection 305 in a lower inner portion, which has a diameter smaller than that of the base plate 120 so that the base plate 120 is supportedly caught on an upper portion of the fitting projection 305. The container 400 also includes a lower fixture 307 for wrapping and structurally reinforcing the lower end of the outer shell 110.

As in the second embodiment, the lower fixture 307 includes a flange 308 extending along a lower edge of the outer shell 110 and a supporting face 309 folded from the flange 308 and extending along a lower outer edge of the outer shell 110.

The container also includes an inner shell 250 within the outer shell 110, which can be fixed by a lower end to the base plate 120. The inner shell 250 has a folded portion 252 in an upper end for structurally reinforcing the inner shell 250.

The outer shell 110 has an outer protrusion 260 adjacent to a lower end of the upper fixture 230, which is enlarged in diameter to structurally reinforce the outer shell 110.

Figure 13:
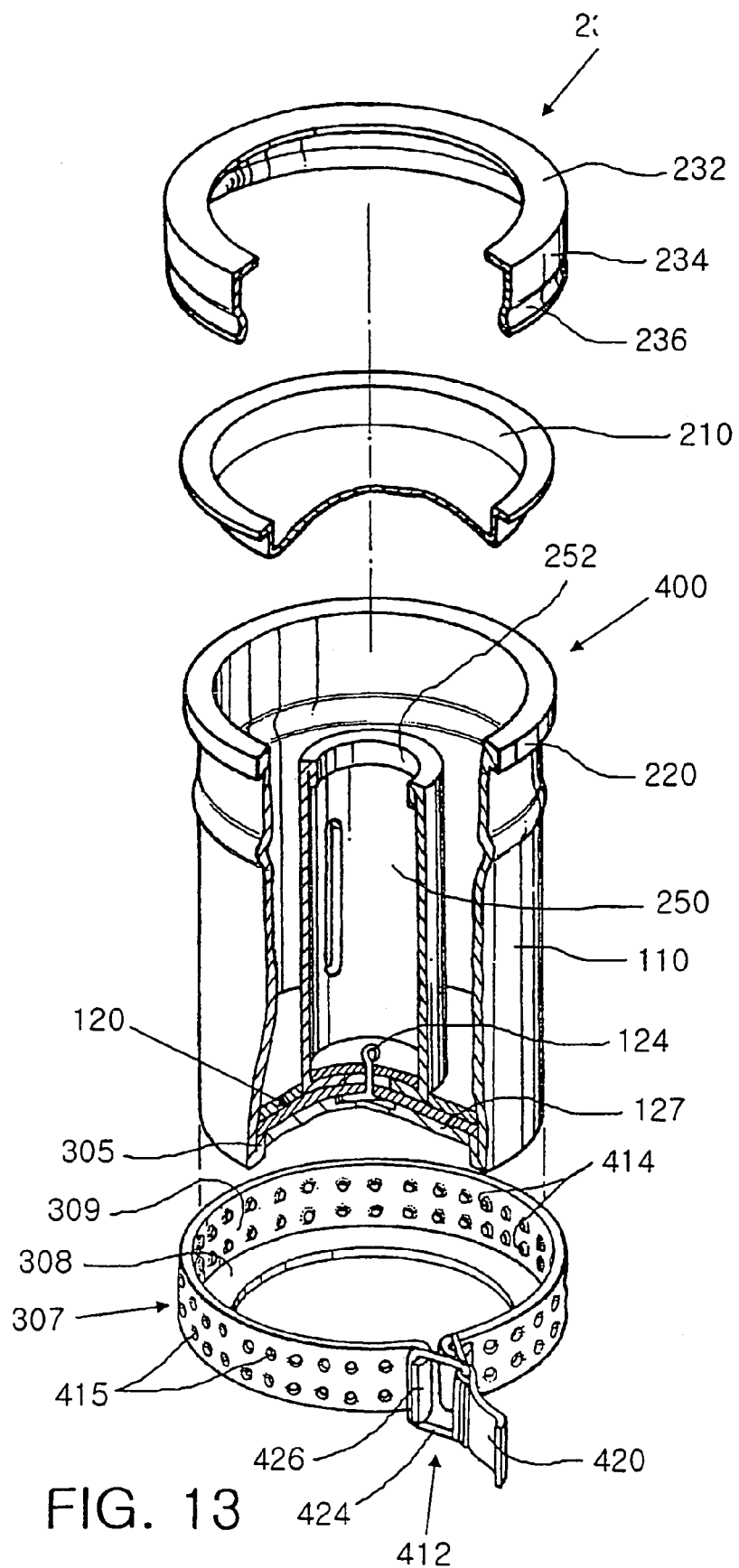
FIG. 13 is a partially broken perspective view of the welding wire container having a reinforcing member with a clamp according to the third embodiment of the invention.

The third embodiment of the invention can have a variation of the lower fixture 307. As shown in FIG. 13, the lower fixture 307 has an annular flange 308 extending along a lower edge of the outer shell 110 and a supporting face 309 folded from the flange 308 and extending along a lower outer periphery of the outer shell 110.

The flange 308 and the supporting face 309 have cut sections formed in a radial direction of the outer shell 110 and clamping means 412 at both ends of the cut sections. The clamping means 412 tightens the lower end of the outer shell 110 so as to closely contact the base plate 120 with the fitting projection 305 of the outer shell 110.

The supporting face 309 of the lower fixture 307 has a number of holes 414 perforated from an outer face toward an inner face and burrs 415 projected from the holes 414 for being fixed to the outer periphery of the outer shell 110. The clamping means 412 is in the form of a clamp.

The clamp 412 has a handle 420 which is rotatably mounted on one end of the supporting face 309, a hook 424 in a middle portion of the handle 420 and a protrusion 426 at the other end of the supporting face 309 on which the hook 424 can be hung. The handle 420 is flapped toward the protrusion 426, the hook 424 is hung around the protrusion 426, and then the handle 420 is flapped away from the protrusion 426 allowing the hook 424 to pull the protrusion 426. This results a clamping structure in which the ends of the supporting face 309 are strongly connected to each other via the hook 424 and the protrusion 426.

In the above construction, the lower fixture 307 more securely supports the lower end of the outer shell 110 with the clamping means 412 while the number of burrs 415 are pressed against the lower end of the outer shell 110 to more stably support the same.

The welding wire container 400 having such a lower fixture 307 according to the third embodiment of the invention is more structurally reinforced in the lower end of the outer shell 110 to stably store the welding wire W. The outer shell 110, the inner shell 250, the base plate 120 and the upper fixture 230 are mostly made of paper, and the lower fixture 307 is made of paper. This means that substantially all components can be made of paper. Alternatively, only the lower fixture 307 having the clamp 412 can be made of steel to minimize use of steel so that the container can be very simply discarded after exhaustion thereof.

FIG. 14 shows the usage of the welding wire container 400 according to the third embodiment of the invention. When it is needed to draw out the welding wire W stacked between the outer shell 110 and the inner shell 250, the upper fixture 230 made of paper is pulled upward, the lid 210 is removed, the head cap 238 in the form of a conical transparent material is mounted thereon, and then the upper fixture 230 is mounted again. This completes connection between the head cap 238 and the outer shell 110 so that the welding wire W can be drawn out.

From this position, the welding wire W is drawn out of the outer shell 110 via a tube 238a in the apex of the head cap 238, and then continuously fed toward a welding wire feeder (not shown).

Figure 15A:
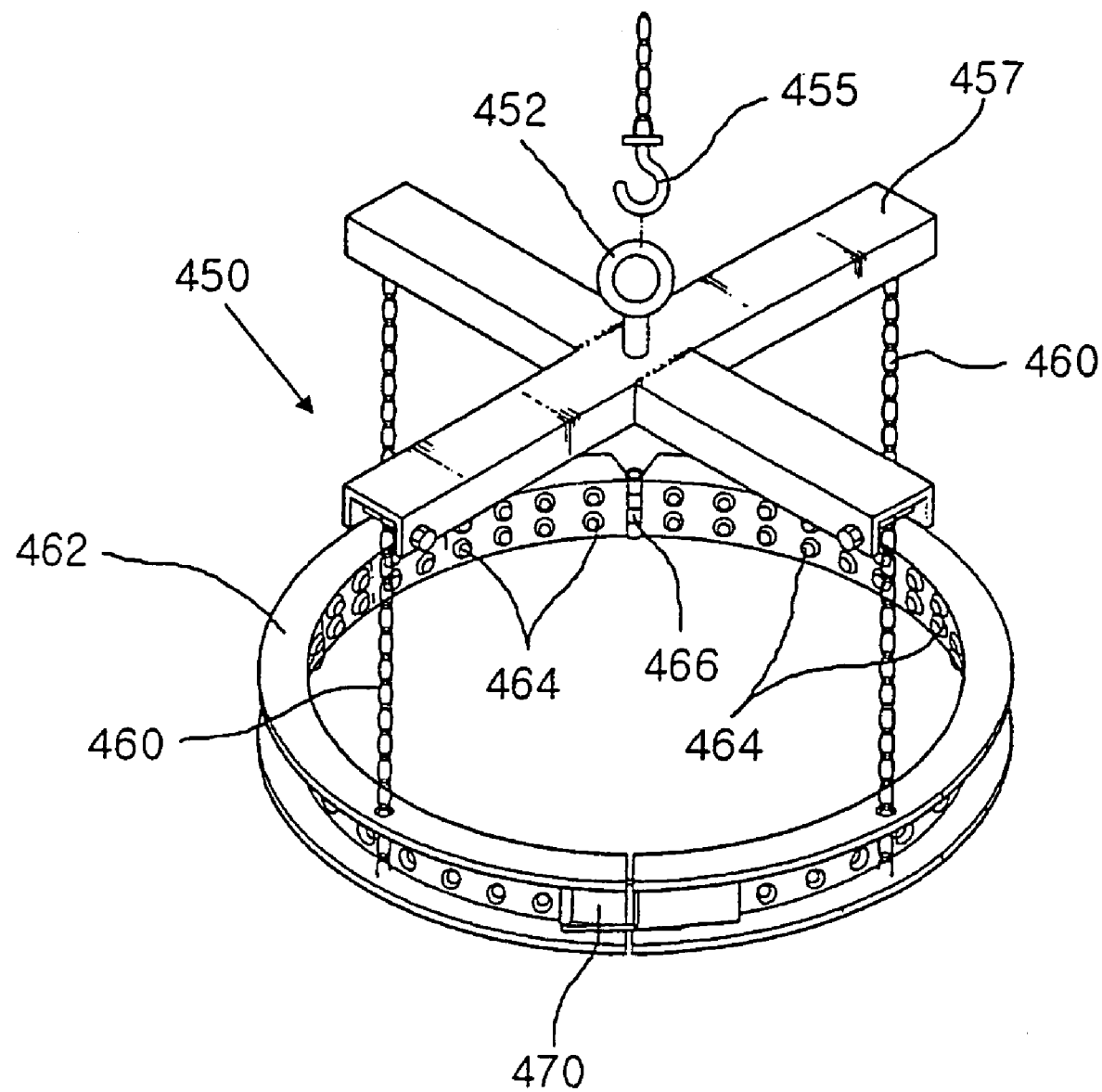
Figure 15B:
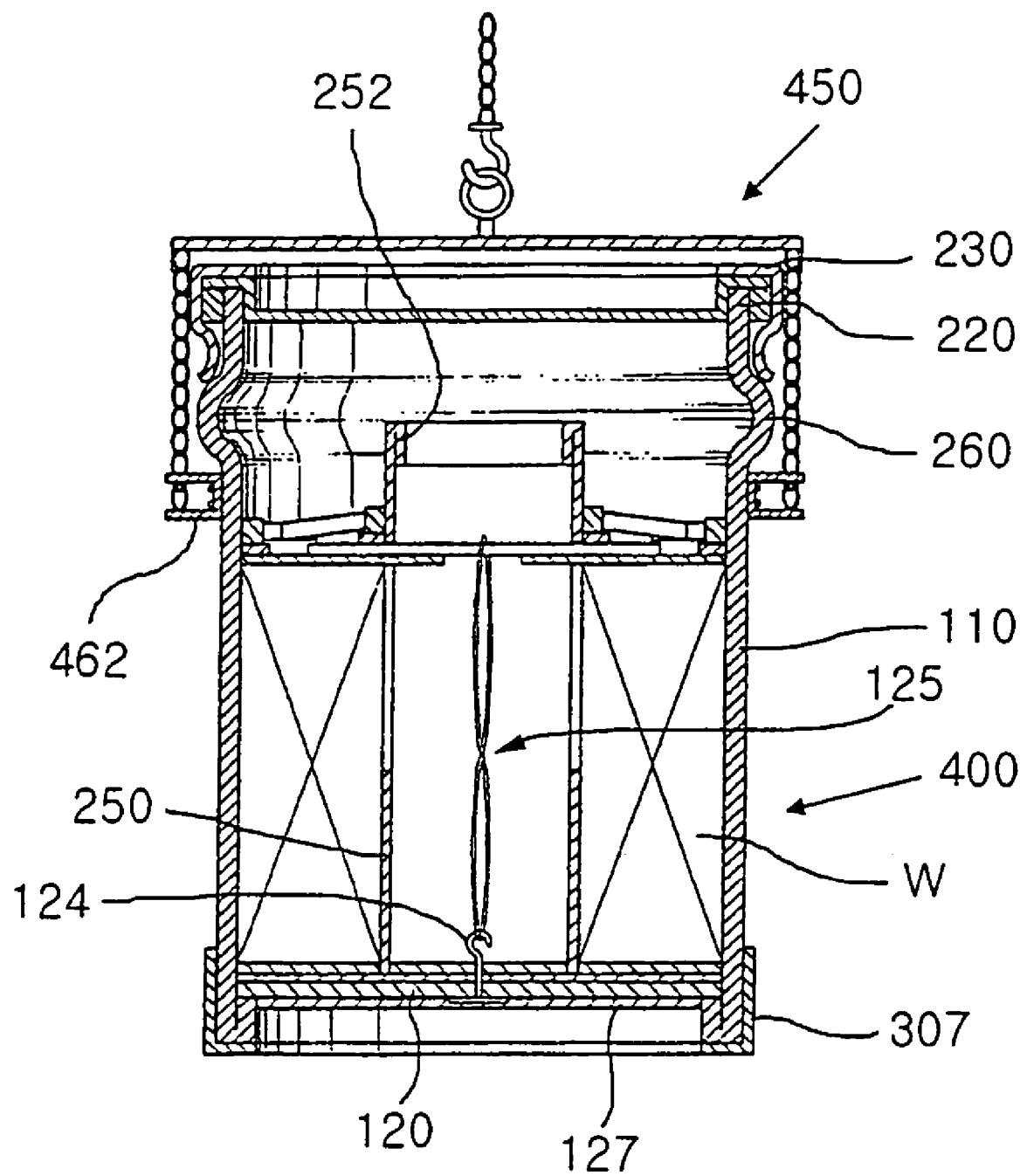

FIGS. 15a and 15b show a structure of a transport jig 450 in use for transporting the welding wire container of the invention. The transport jig 450 includes a ring 452 for being caught by a hook 455 of a crane, a support frame 457 under the ring 452 and a mounting ring 462 under the support frame 457 connected thereto via a plurality of chains 460.

The mounting ring 462 has a U-shaped cross section, and is halved into arciform bodies. The mounting ring 462 has a number of burrs 464 in an inner periphery. The halved arciform bodies are connected to each other, hingeably at one ends and via a clamp 470 at the other ends, to define one circular ring-shaped structure.

FIG. 15b shows the usage of the transport jig 450. The clamp 470 of the mounting ring 462 is opened to enlarge the diameter of the mounting ring 462, the diameter-enlarged mounting ring 462 is fitted around the outer shell 110 under the outer protrusion 260, and then the clamp 470 is shut to couple the mounting ring 462 with the outer shell 110. When the transport jig 450 is raised via the hook 455 and the like from this position, the mounting ring 462 raises the container via the outer protrusion 260 allowing transport thereof.

Although the transport jig 450 can fix the container by tightening the clamp 470 only, the number of burrs 464 in the inner periphery of the mounting ring 464 are pressed against the outer face of the container thereby further enhancing the coupling force with the outer shell 110.

Figure 16A:
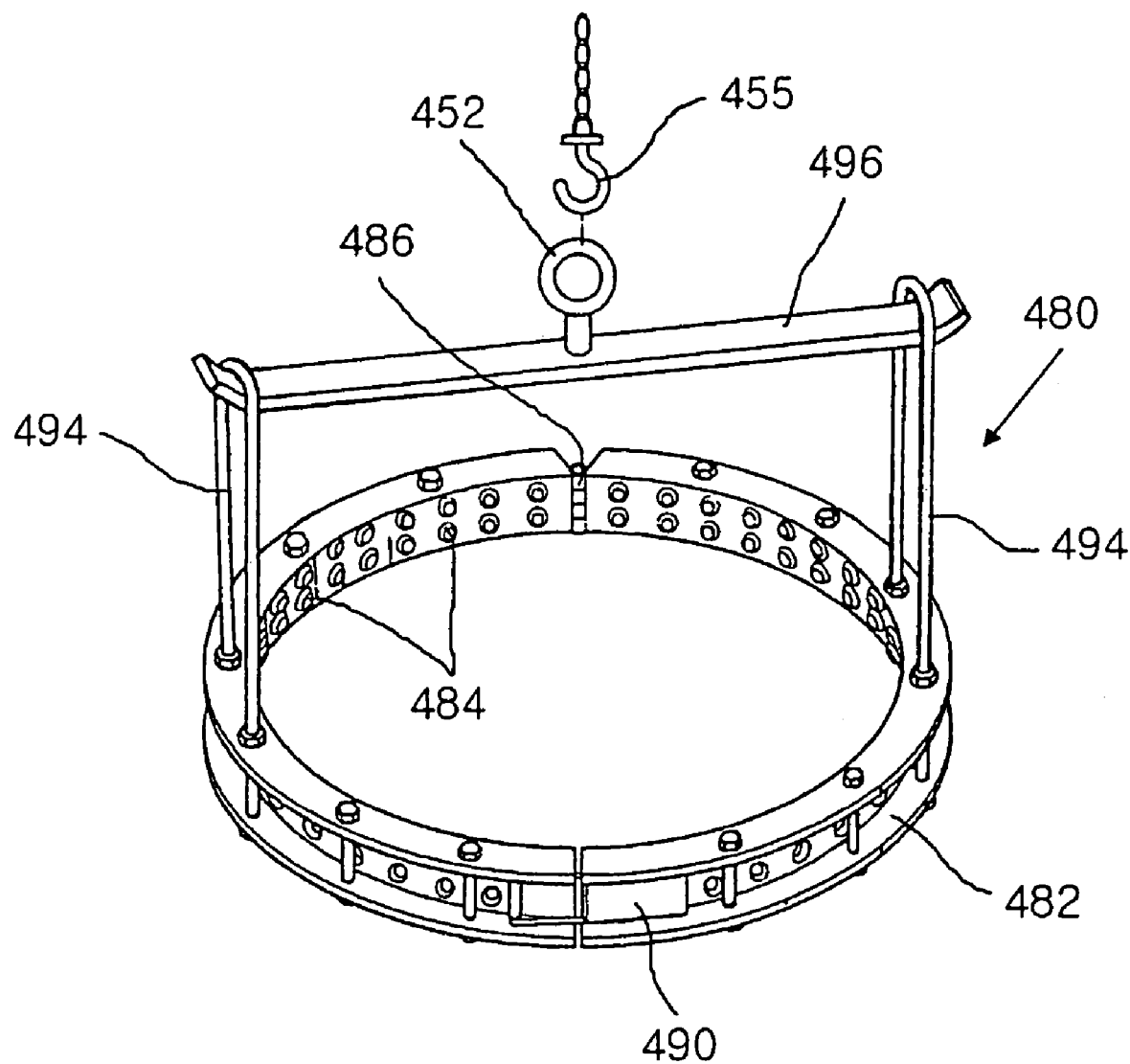
Figure 16B:
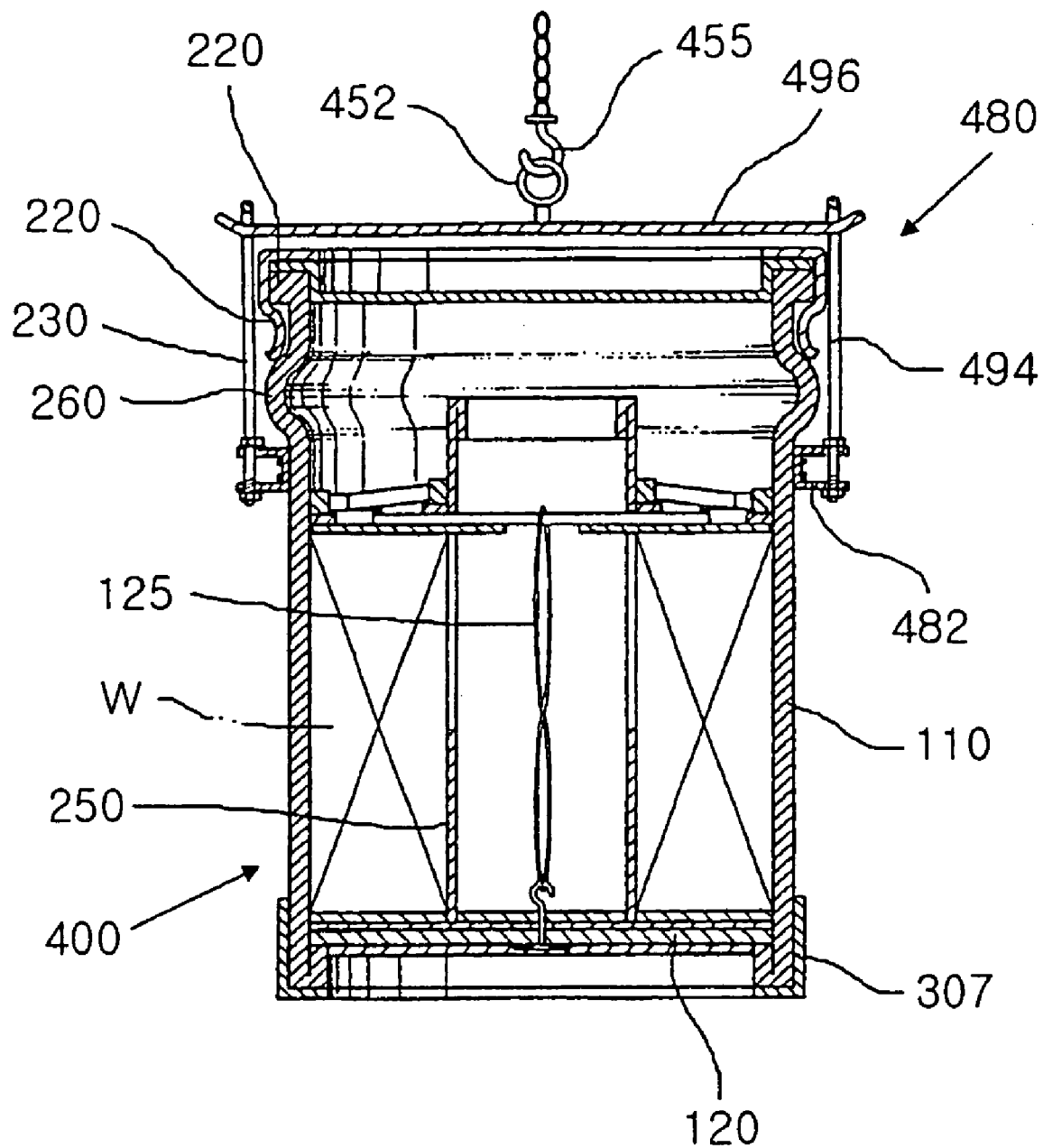

FIGS. 16a and 16b show a structure of an alternative transport jig 480. The mounting ring 482 has a U-shaped cross section, and is halved into arciform bodies like the above construction. The mounting ring 482 has a number of burrs 484 in an inner periphery. The halved arciform bodies are connected to each other, hingeably at one ends and via a clamp 490 at the other ends, to define one circular ring-shaped structure.

The transport jig 480 includes a plurality of hooks 494 at upper portions of the mounting ring 482, in which the hooks 494 are fixedly fitted around both ends of a hoist bar 496 which is caught by a hook 455 and so on of a crane.

FIG. 16b shows the usage of the transport jig 480. The clamp 490 of the mounting ring 482 is opened to enlarge the diameter of the mounting ring 482, the mounting ring 482 is fitted around the outer shell 110 under the outer protrusion 260, and the clamp 490 is shut to couple the mounting ring 482 with the outer shell 110. When the transport jig 480 is raised via the hook 455, the hoist bar 496 and the like from this position, the mounting ring 482 raises the container via the outer protrusion 260 allowing transport thereof.

Therefore, workers can readily move containers which store heavy welding wire stacked therein by using the transport jig 450 or 480 as above.

Figure 17A:
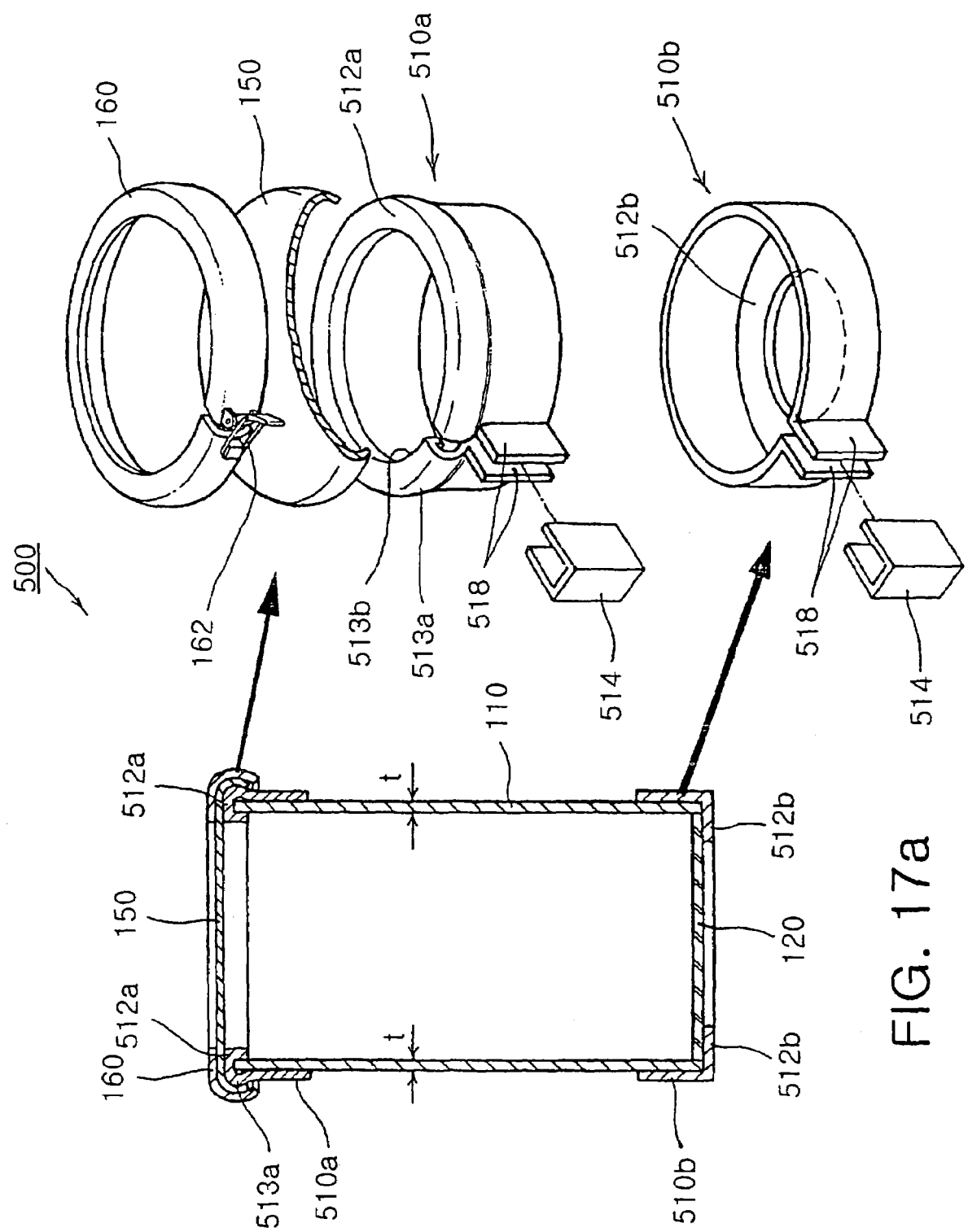
FIGS. 17a and 17b illustrate welding wire containers according to a fourth embodiment of the invention.
Figure 17B:
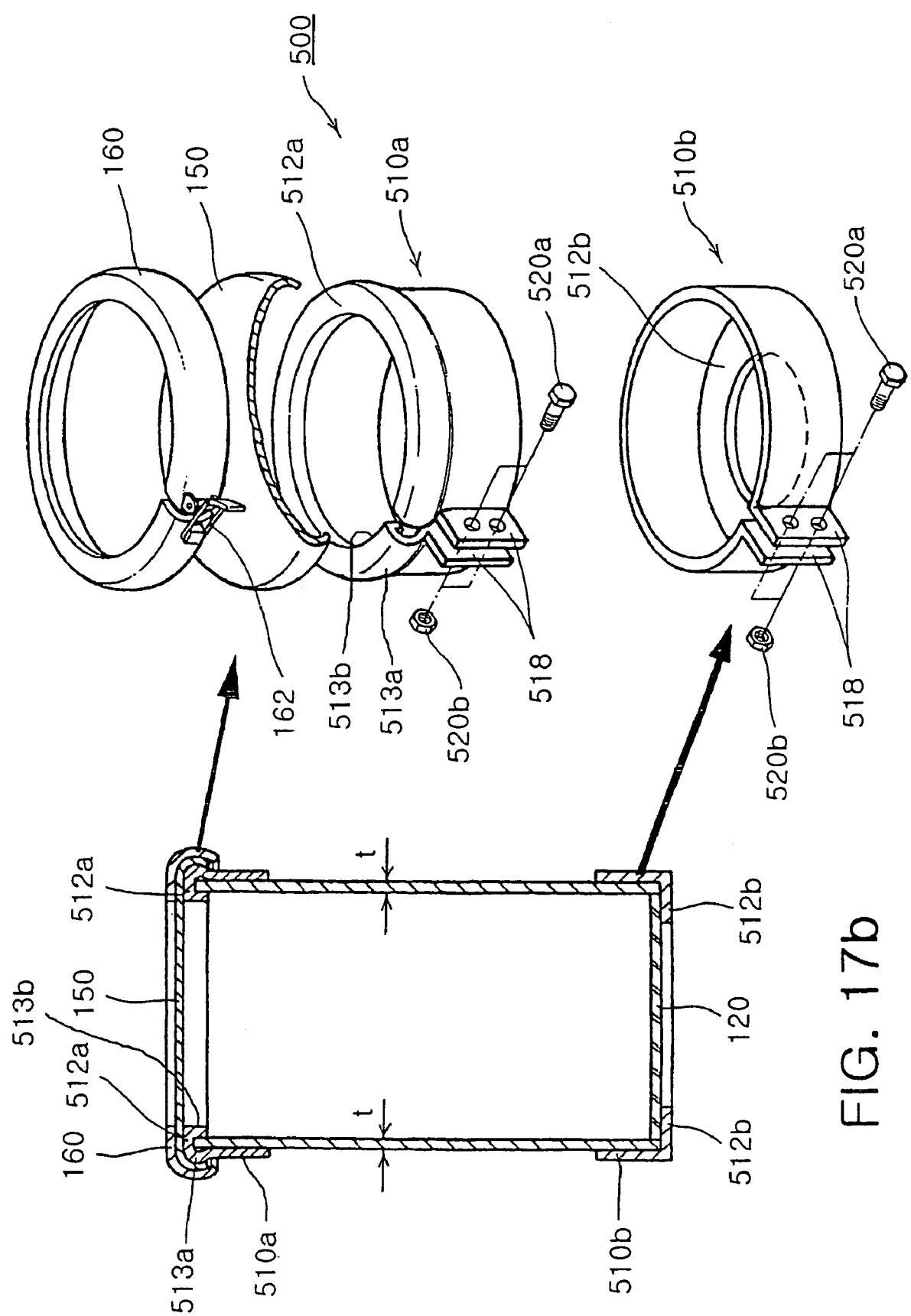
Figure 17C:
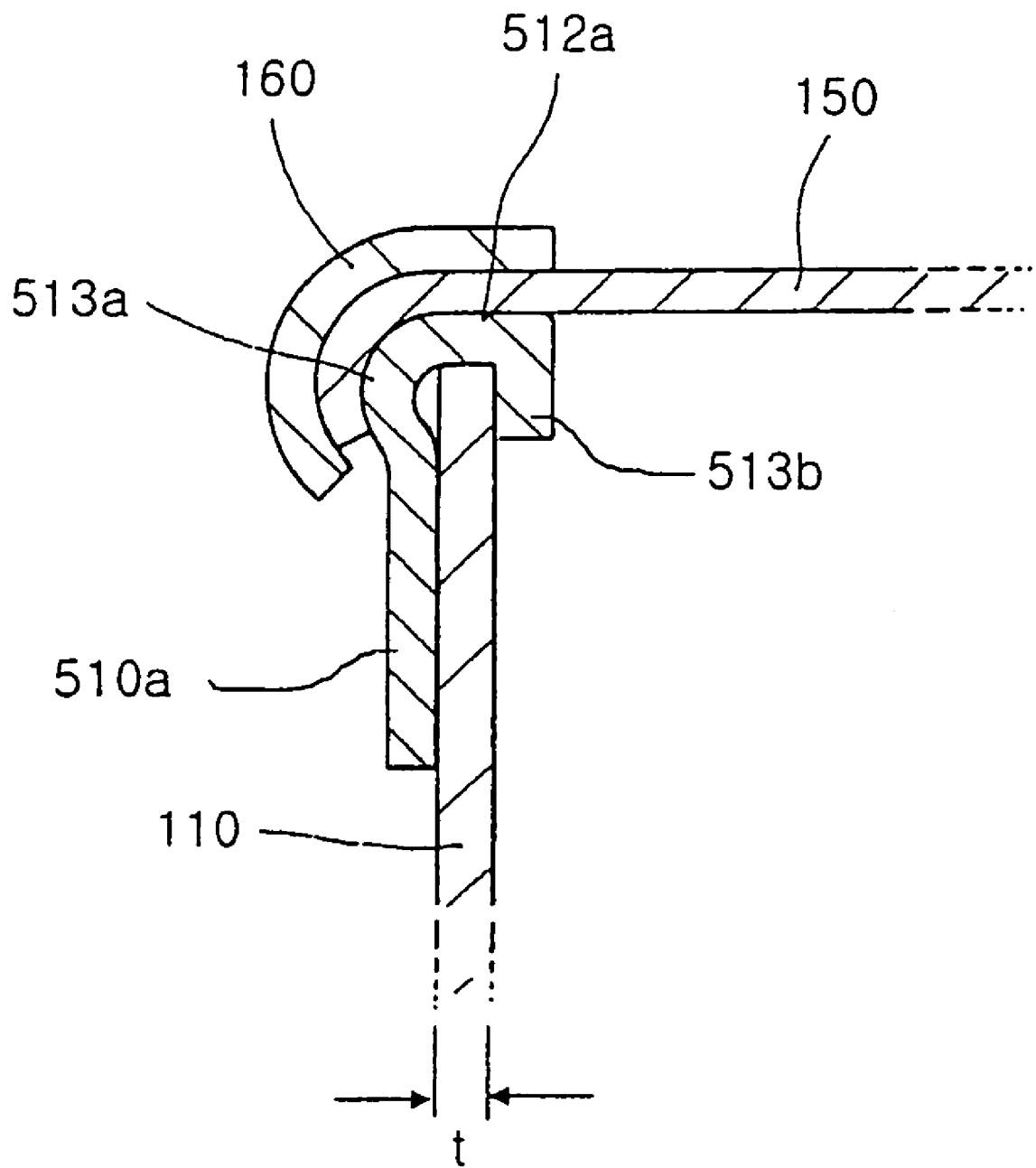
FIG. 17c is a sectional view magnifying a coupling status of an upper fixture, a lid and a ring member in the welding wire container according to the fourth embodiment of the invention.

FIG. 17a shows the welding wire container 500 according to the fourth embodiment of the invention. Upper and lower fixtures 510a and 510b are fitted respectively around upper and lower portions of an outer shell 110. The upper fixture 510a has an inner flange 512 extending substantially identical with the thickness t of the outer shell 110 for wrapping the same. As shown in FIG. 17c, an annular projection 513a is formed in an outer portion of the flange 512a for engaging into a lid 150 and a ring member 160, and a folded end 513b is formed in an inner portion of the flange 512a for wrapping the upper end of the outer shell 110.

Further, the upper fixture 510a has clamping means for tightening both ends thereof, which includes projected pieces 518 at the both ends of the upper fixture, 510a and a clip 514 for securely coupling the projected pieces 518. Therefore, the upper fixture 510 is fixed in the form of a ring via the clip 514 and the projected pieces 518.

The lower fixture 510b is adapted to wrap a lower portion of the outer shell 110 therein, and includes an inner flange 512b extending toward a base plate 120. The inner flange 512b supports the base plate 120 to function as a fitting projection thereby preventing the base plate 120 from slipping down.

The lower fixture 510b has projected pieces 518 at both ends. A clip 514 is fitted around the projected pieces 518 to strongly tighten both of the projected pieces 518. This allows the outer shell 110 to couple with the base plate 120 while maintaining the original shape so that the lower fixture 510 is not readily detached or slipped down. Further the outer shell 110 is not distorted owing to resistance of the base plate 120 under pressure from the inside of the outer shell 110. Also the outer shell 110, the base plate 120 and the lower fixture 510b are readily coupled and disassembled as the projected pieces 518 and the clip 514 are tightened and loosened.

Therefore the welding wire container 500 according to the fourth embodiment of the invention is unnecessary of any complicated processes in manufacture thereof. In discarding any exhausted container, dismantled wastes are readily stored and transported. Further, in incinerating the exhausted container, those portions made of paper can be separately fired while dismantled steel portions can be reused.

The projected pieces 518 draw together the both ends of the upper and lower fixtures 510a and 510b so that they are bound together. Alternatively, as shown in FIG. 17b, bolts 520a and nuts 520b can replace the projected pieces 518 to tighten the both ends of the upper and lower fixtures 510a and 510b. The fixtures 510a and 510b can be readily coupled and disassembled with the bolts 520a and the nuts 520b like this.

Figure 17D:
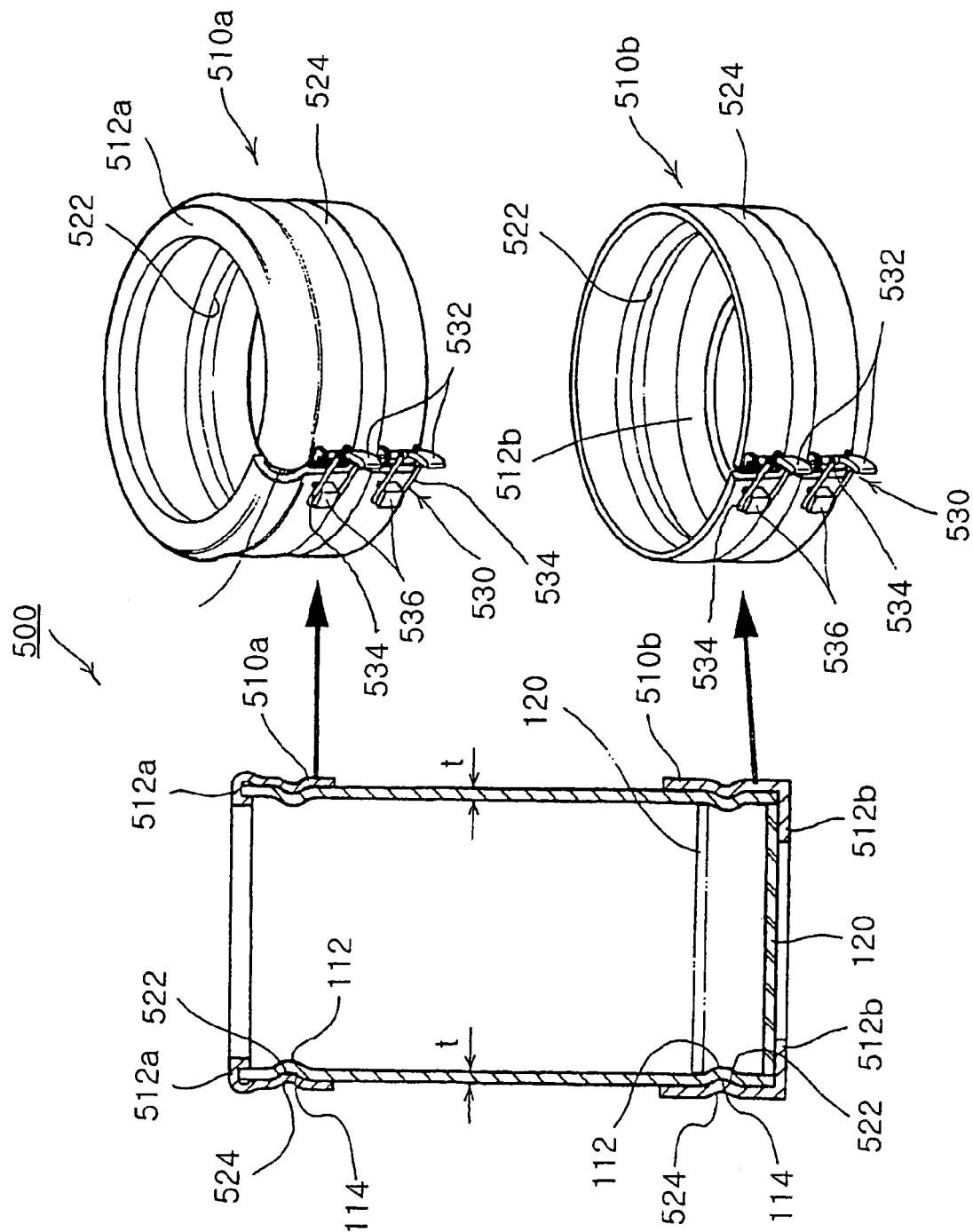
FIG. 17d is a magnification of another alternative welding wire container according to the fourth embodiment of the invention.
Figure 17E:
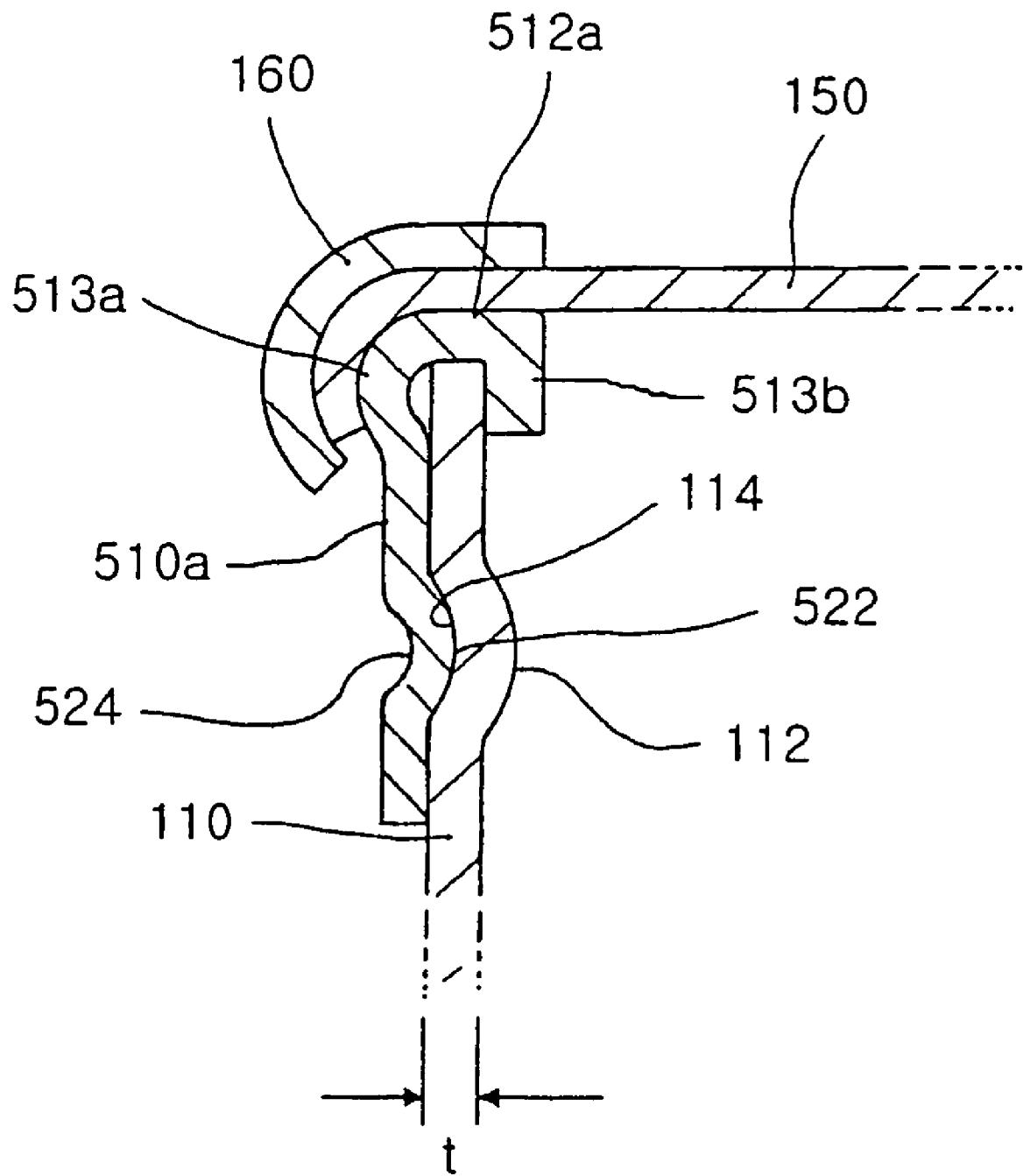
FIG. 17e is a sectional view magnifying a coupling status of an upper fixture, a lid and a ring member in the welding wire container shown in FIG. 17d.

FIG. 17d shows another alternative structure of outer shell 110, upper and lower fixtures 510a and 510b and clamping means unlike those shown in FIGS. 17a and 17b. The upper and lower fixtures 510a and 510b each have a protrusion 522 in an inner periphery and a groove 524 in an outer periphery. The outer shell 110 has protrusions 112 in inner peripheries of upper and lower portions and grooves in outer peripheries thereof. The protrusion 522 of the upper fixture 510a corresponds to the groove 114 of the outer shell 110. The upper fixture 510a has an inner flange 512a extending substantially identical with the thickness t of the outer shell 110 for wrapping the same. As shown in FIG. 17e, the upper fixture 510a has an annular projection 513a in an outer periphery of the flange 512a for engaging into the lid 150 and the ring member 160 and a folded end 513b in an inner periphery of the flange 512a for wrapping the upper end of the outer shell 110.

The protrusion 522 of the lower fixture 510b is caught on the lower groove 114 of the outer shell 110 so as to prevent the lower fixture 510b and the base plate 120 from slipping down owing to the weight of the welding wire W.

The lower protrusion 112 of the outer shell 110 is so positioned to catch the base plate 120 thereon as shown in dotted lines in FIG. 17d. The clamping means for clamping ends of the upper and lower fixtures 510a and 510b are in the form of clamps.

In the clamps 530, handles 532 are pivotably mounted on each of upper and lower portions of one end of the upper and lower fixtures 510a and 510b, hooks 534 are installed respectively in middle portions of the handles 532, and protrusions 536 are formed in upper and lower portions of the other ends of the upper and lower fixtures 510a and 510b. Each of the handle 532 is flapped toward a pertinent protrusion 536, a pertinent hook 534 is hung around the protrusion 536, and the handle 532 is pivoted away from the protrusion 536 and then pressed so that the hook 534 pulls the protrusion 536. This obtains strong connection between the ends of the upper and lower fixtures 510a and 510b via the hooks 534 and the protrusion 536.

In order to release the connection, the each handle 532 is pivoted in an opposite direction toward a pertinent protrusion 536 so that a pertinent hook 534 is released from the protrusion 536. The upper and lower fixtures 510a and 510b are disconnected in this manner.

Alternatively, the clamping means may utilize a clip 514, a bolt 520a, a nut 520b and so on, or any structures which facilitate coupling and disassembly of the upper and lower fixtures. However, welding is not preferred since it bonds the fixtures in an undetachable manner.

Figure 18A:
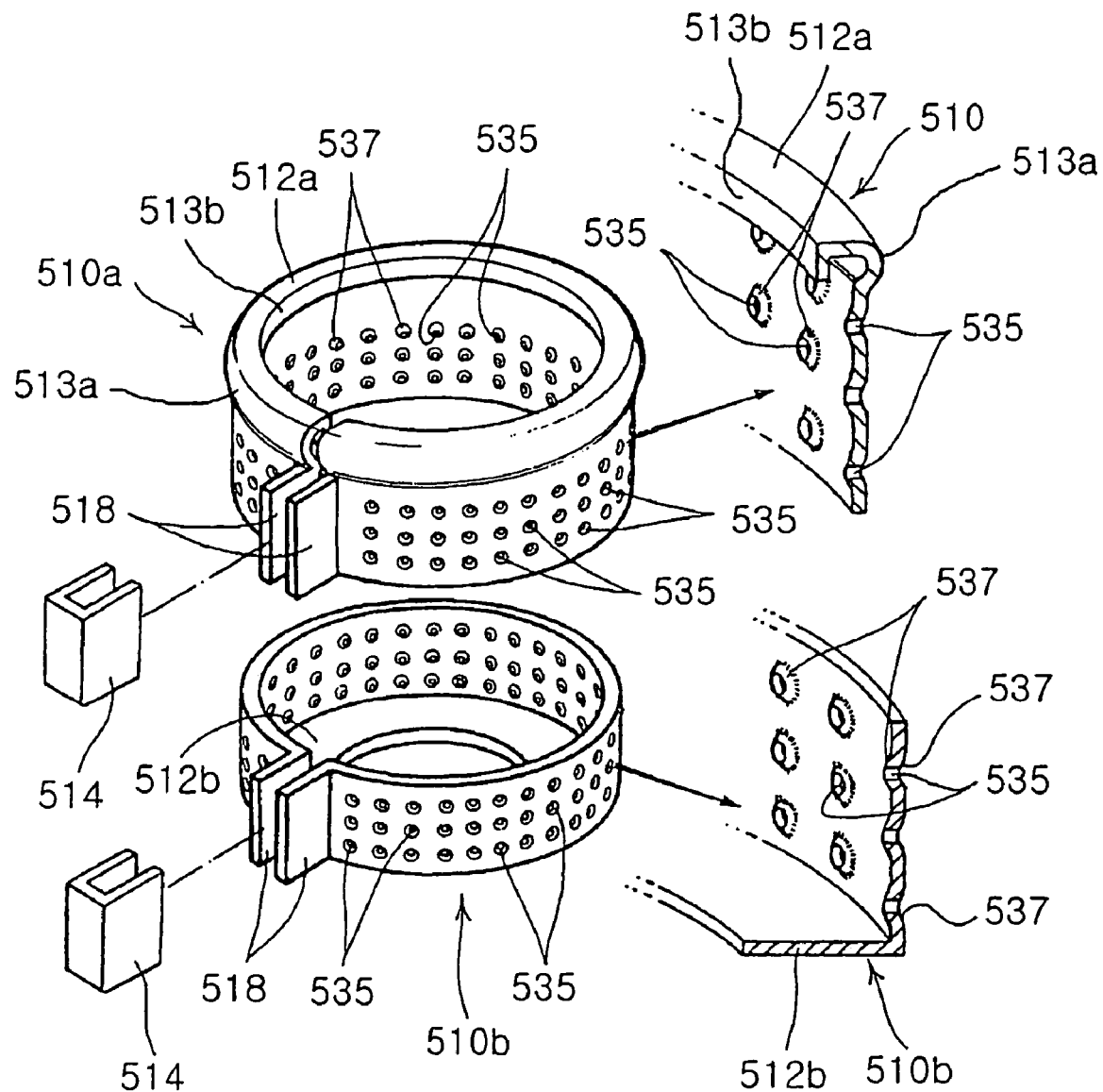
FIG. 18a illustrates alternative upper and lower fixtures equipped in the welding wire container according to the fourth embodiment of the invention.

FIG. 18a shows an alternative structure of upper and lower fixtures 510a and 510b equipped in the welding wire container 500 according to the invention. The upper and lower fixtures 510a and 510b each have a number of holes 535 perforated from an outer face toward an inner face and burrs 537 projected around the holes 535 in the inner face. The projected burrs 537 strongly press the outer face of the outer shell 110 so as to effectively prevent the lower fixture 510b and the base plate 120 from slipping down out of the outer shell 110 under the weight of the welding wire W.

Figure 18B:
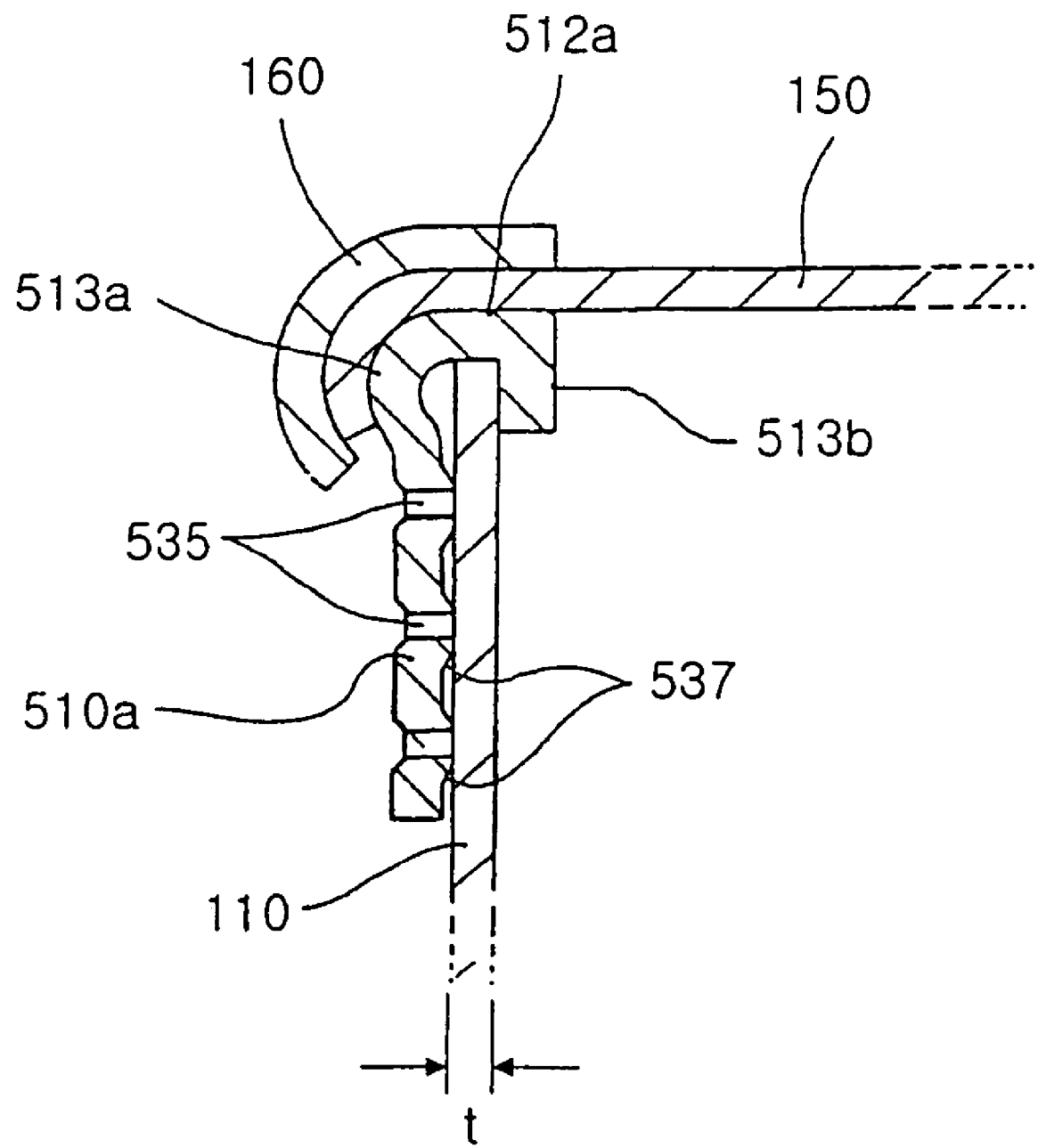

As shown in FIG. 18b, the upper fixture 510a includes an inner flange 512a extending substantially identical with the thickness t of the outer shell 110 for wrapping the outer shell 110, an annular projection 513a extending from an outer periphery of the flange 512a for engaging into the lid 150 and the ring member 160 and a folded end 513b extending from an inner periphery of the flange 512a for wrapping the upper end of the outer shell 110.

Figure 19A:
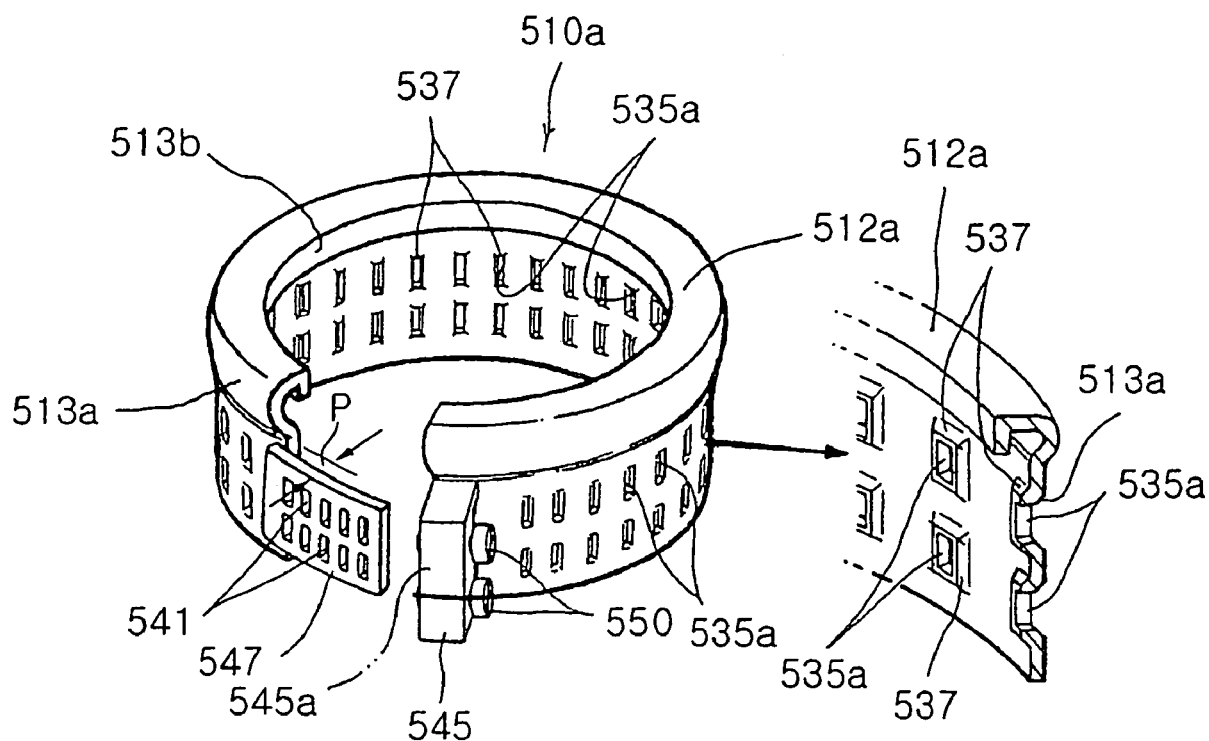
Figure 19B:
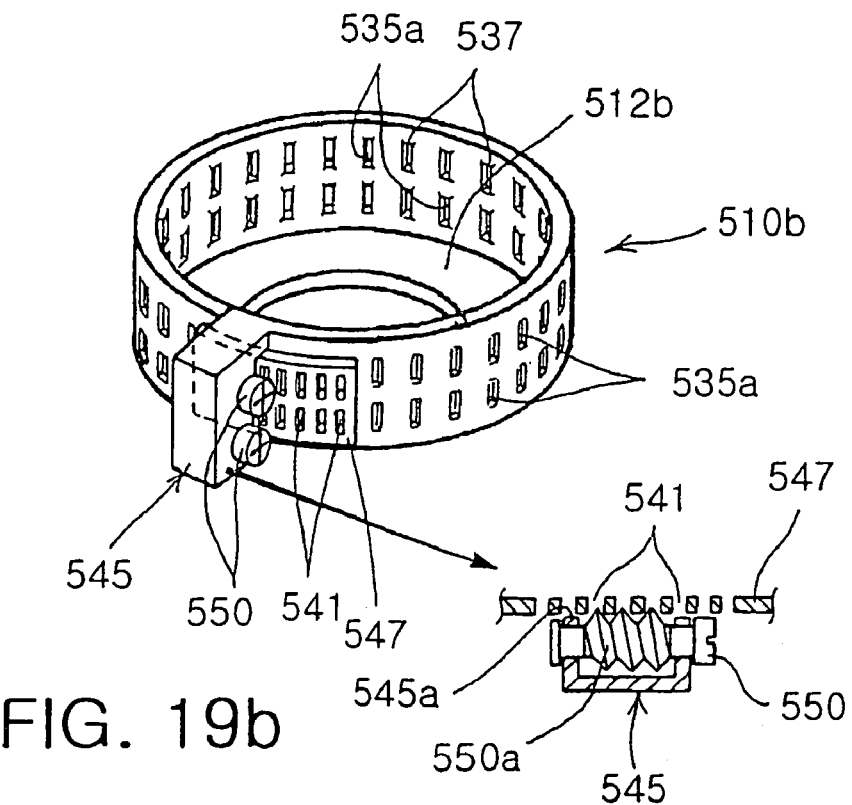
Figure 20A:
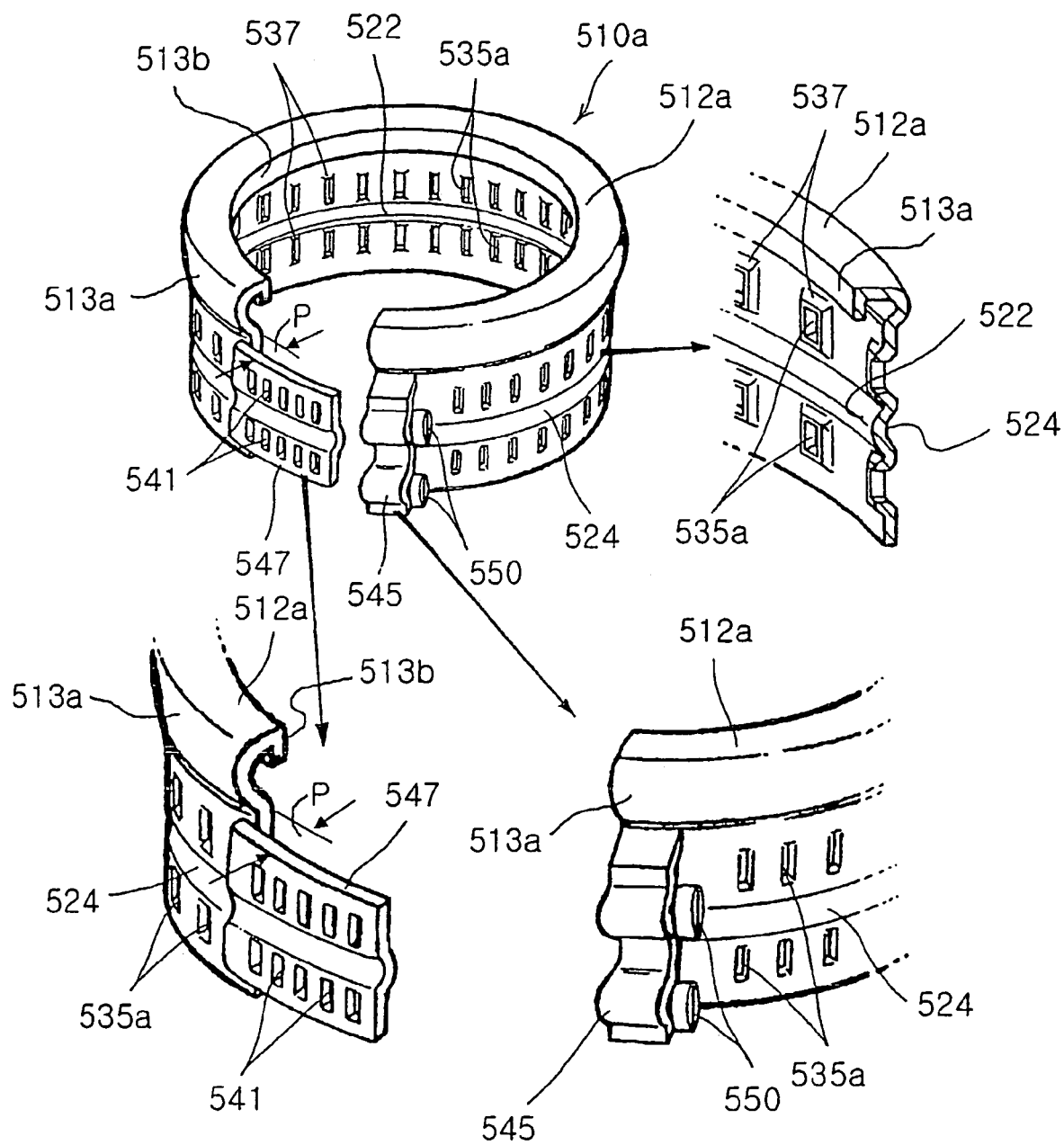
Figure 20B:
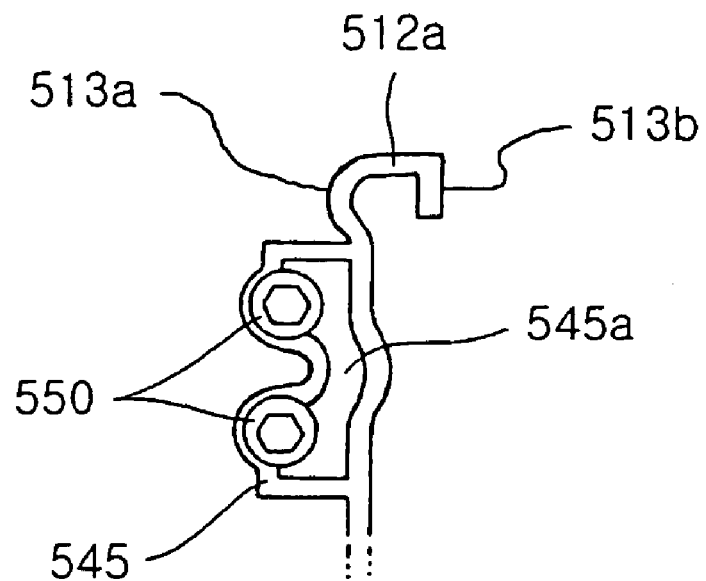
Figure 20C:
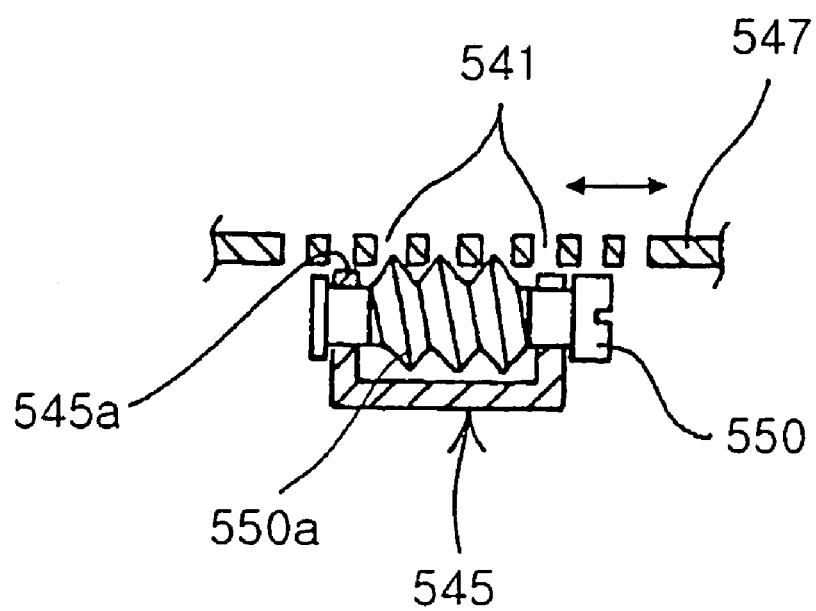
Figure 20D:
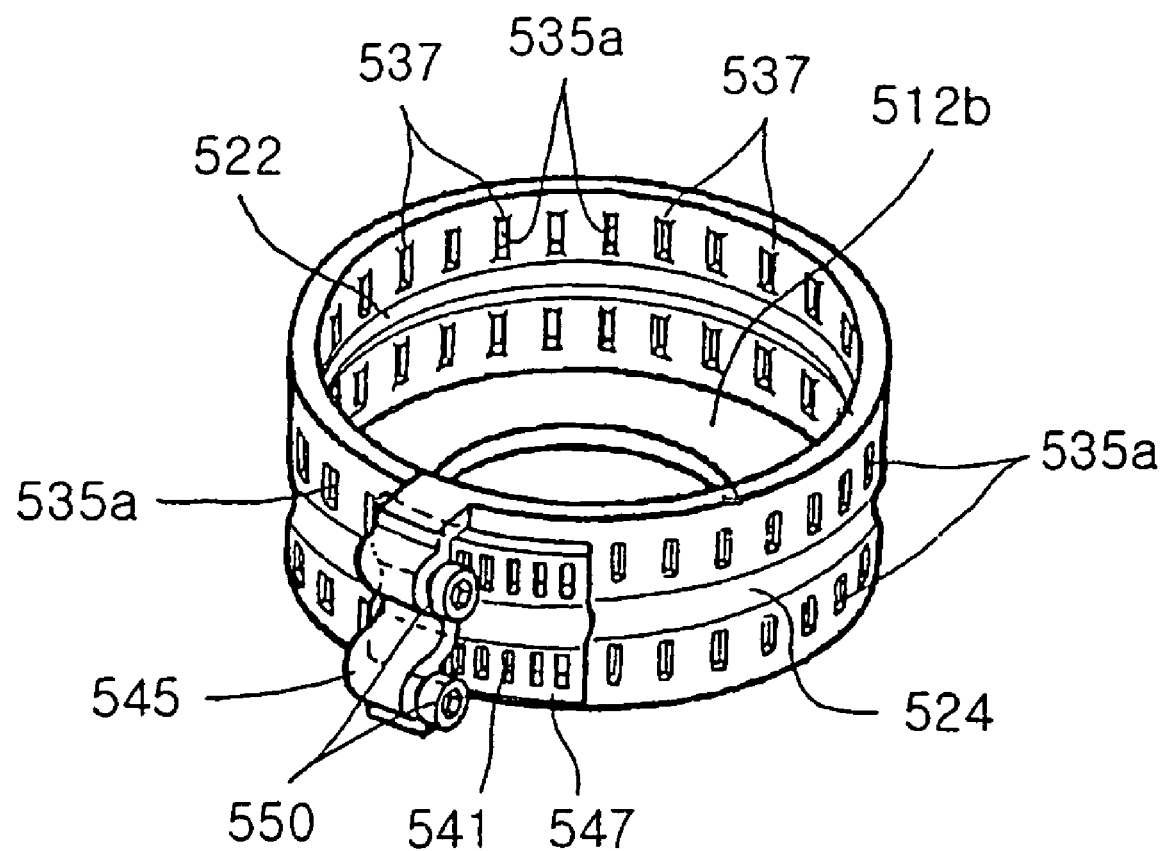

FIGS. 19a and 19b show another alternative structure of upper and lower fixtures 510a and 510b equipped in the welding wire container 500 according to the fourth embodiment of the invention. In the upper and lower fixtures 510a and 510b, a number of slots 535a are perforated perpendicular to the direction of the upper and lower fixtures 510a and 510b. The slots 535a are arranged in rows in the outer faces of the upper and lower fixtures 510a and 510b. The upper and lower fixtures 510a and 510b are longer than the outer circumference of the outer shell 110 so that ends of the upper and lower fixtures 510a and 510b are partially overlapped.

The upper fixture 510a has an annular projection 513a extending from an outer periphery of the flange 512a for engaging into the lid 150 and the ring member 160. A folded end 513b is alternatively extended from an inner periphery of the flange 512a for wrapping the upper end of the outer shell 110. The upper and lower fixtures 510a and 510b each include clamping means having a clamp 545 at one end thereof and an insert 547 at the other end. The insert 547 has a number of incisions 541. A plurality of bolts 550 are rotatably installed in the clamp 545, and have screw threads 550a corresponding to the incisions 541. The flange 512a and a lower edge of the upper fixture 510a are partially removed to form the insert 547 into a configuration adequate for insertion into the clamp 545.

The insert 547 is slightly offset outward from the circumferential direction of the upper fixture 510a for a given interval P for engaging into the clamp 545.

When the insert 547 is inserted into the clamp, both ends of the upper fixture 510a correctly match each other.

In the meantime, the clamp 545 and the insert 547 are so fixed that the bolts 550 can be rotated by its head and tail in the clamp 545. A portion of the flange 512a is removed from the insert 547. The insert 547 is inserted into a bore 545a of the clamp 547 and screwed out between the bolts 550 in the clamp 545 and each of the upper and lower fixtures 510a and 510b so that rotation of the bolts 550 draws together the both ends of the fixture 510a or 510b so that they are bound together.

When bound together as above, a portion of the flange 512a of the upper fixture 510a adjacent to the insert 547 correspondingly contacts with another portion of the flange 512a of the upper fixture 510a adjacent to the clamp 545 so that the outer shell 110 and the upper fixture 510a can be readily coupled and disassembled. In the same manner, a portion of the flange 512b of the lower fixture 510b adjacent to the insert 547 correspondingly contacts with another portion of the flange 512b of the lower fixture 510b adjacent to the clamp 545 so that the outer shell 110, the base plate 120 and the lower fixture 510b can be readily coupled and disassembled.

In the meantime, the upper and lower fixtures 510a and 510b each have burrs 537 around the entire slots 535 except for the insert 547 so as to prevent the lower fixture 510b and the base plate 120 slipping down from the outer shell 110 under the weight of the welding wire. Rotation of the bolts 550 can enhance the coupling force between the upper and lower fixtures 510a and 510b and the outer shell 110 as well as facilitate disassembly thereof.

FIGS. 20a to 20d show further another alternative structure of upper and lower fixtures 510a and 510b.

The upper and lower fixtures 510a and 510b each include a protrusion 522 in an inner periphery and a groove 524 in an outer periphery. As shown in FIG. 17e, the outer shell 110 engaging into the upper and lower fixtures 510a and 510b includes protrusions 112 in inner peripheries and grooves 114 in outer peripheries in upper and lower portions. The protrusions 112 in the upper and lower fixtures 510a and 510b correspond respectively to the grooves 114 of the outer shell 110. In particular, the protrusion 522 of the lower fixture 510b is caught on the groove 114 of the outer shell 110 so as to prevent the lower fixture 510b and the base plate 120 from slipping down out of the outer shell 110 under the weight of the welding wire.

The welding wire can be more effectively supported if the base plate 120 is caught on the lower protrusion 112 of the outer shell 110.

Further, the upper and lower fixtures 510a and 510b each include a clamp 545 at one end and an insert 547 at the other end. The insert 547 has a number of incisions 541. A plurality of bolts 550 are rotatably installed in the clamp 545, and have screw threads 550a corresponding to the incisions 541. The insert 547 has a configuration adequate for insertion through a bore 545a in the clamp 545.

The insert 547 is slightly offset outward from the circumferential direction of the upper fixture 510a for a given interval P for engaging into the clamp 545. When the insert 547 is inserted into the clamp, both ends of the upper fixture 510a correctly match each other.

As described above in reference to FIG. 19, the clamp 545 and the insert 547 draw together the both ends of the upper fixture 510a through rotation of the bolts 550 so that the both ends are bound together. The both ends of the lower fixture 510b are drawn together and then bound together in the same manner. It is preferred that burrs 537 are formed around slots 535a in the upper and lower fixtures 510a and 510b except for the insert 547. The upper and lower fixtures 510a and 510b can be selectively tightened by using the clip 514 described in reference to FIG. 17a or the bolts and nuts 520a and 520b in reference to FIG. 17b, or preferably fastened by using the clamp 530 described in reference to FIG. 17d.

Preferably, rotation of the bolts 550 in the clamp 545 causes the threads 550a of the bolts 550 to draw the incisions 541 of the insert 547 tightening the upper and lower fixtures 510a and 510b. This ensures that upper and lower fixtures 510a and 510b can be coupled more strongly and securely while being easily disassembled.

Figure 21:
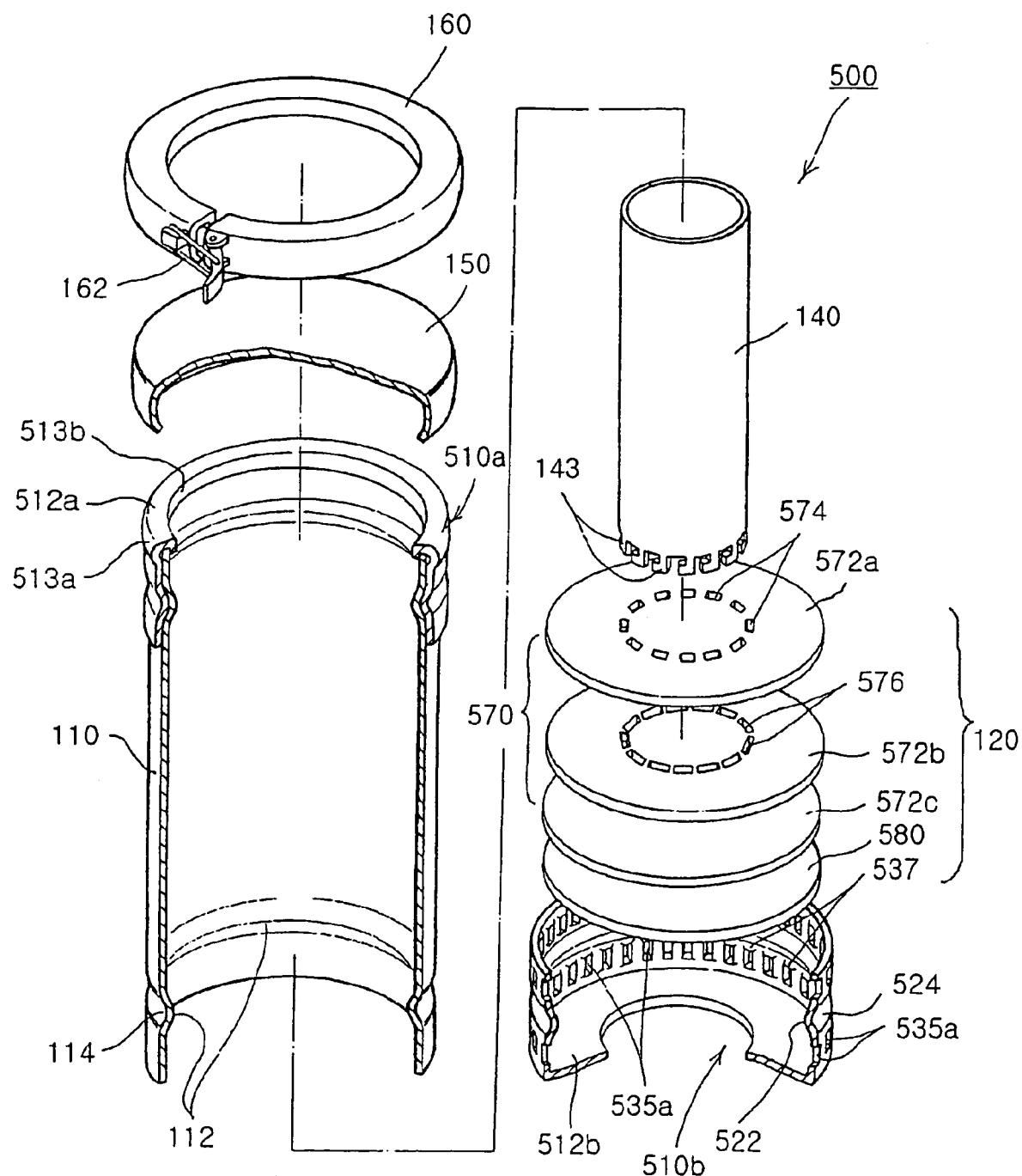
FIG. 21 is an exploded perspective view of a base plate equipped in the welding wire container according to the fourth embodiment of the invention.
Figure 22:
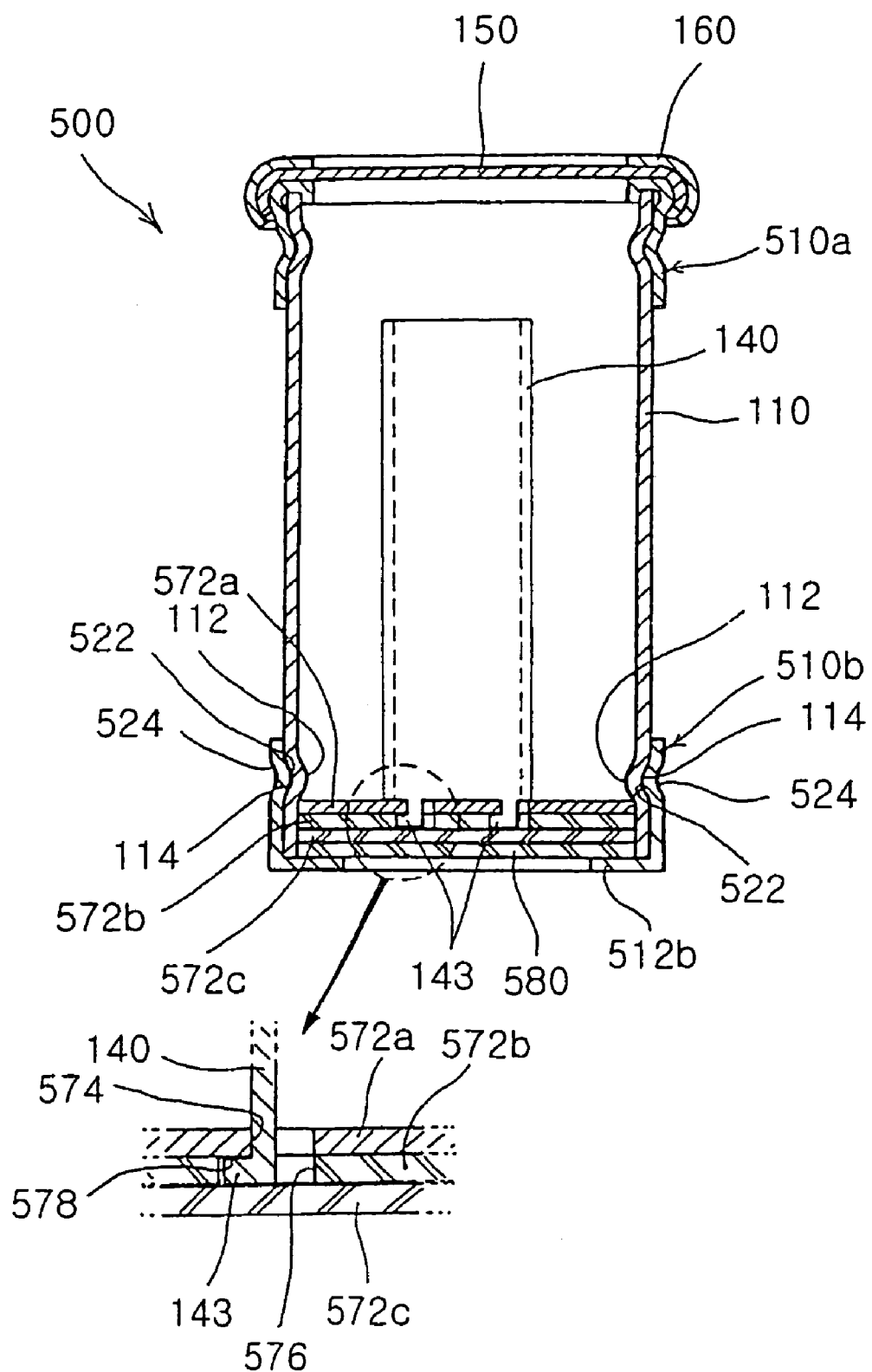
FIG. 22 is a longitudinal sectional view of the welding wire container according to the fourth embodiment of the invention.

As shown in FIG. 21, in the welding wire container 500 according to the fourth embodiment of the invention, the base plate 120 includes a circular plate 570 having a diameter substantially identical with the inside diameter of the outer shell 110 and an underlying circular dampproof plate. The circular plate 570 includes upper, intermediate and lower plates 572a to 572c.

The upper plate 572a has a circular array of holes 574 perforated in a central portion thereof. The intermediate plate 572b has a circular array of slots 576 with the same number as the upper plate 572a, which are perforated in a circumferential direction. The slots 576 in the intermediate plate 572b corresponding to the circular array of the upper plate 572a are perforated longer than the holes 574 in the upper plate 572a. The lower plate 572c is in the form of a circular plate.

The upper plate 572a, the intermediate plate 572b, the lower plate 572c and the circular dampproof plate 580 are layered in their sequence so that the base plate 120 has fitting steps 578 defined by the circular arrays of the upper and intermediate plates 572a and 572b. An inner shell 140 is so erected to correspond to the circular arrays of the upper and intermediate plates 572a and 572b, and has a number of stepped projections 143 in a lower end of thereof. The stepped projections 143 are inserted into the holes 547 of the upper plate 572a, and placed in the slots 576 of the intermediate plate 572b. Rotating the inner shell 140 causes the stepped projections 143 to tightly fit into and fix to the fitting steps 578 defined by the difference of size between the holes 574 and the slots 576. The inner shell 140 is readily coupled to the base plate 120 in this manner. Rotation of the inner shell 140 easily obtains coupling and disassembly between the inner shell 140 and the base plate 120.

Figure 23:
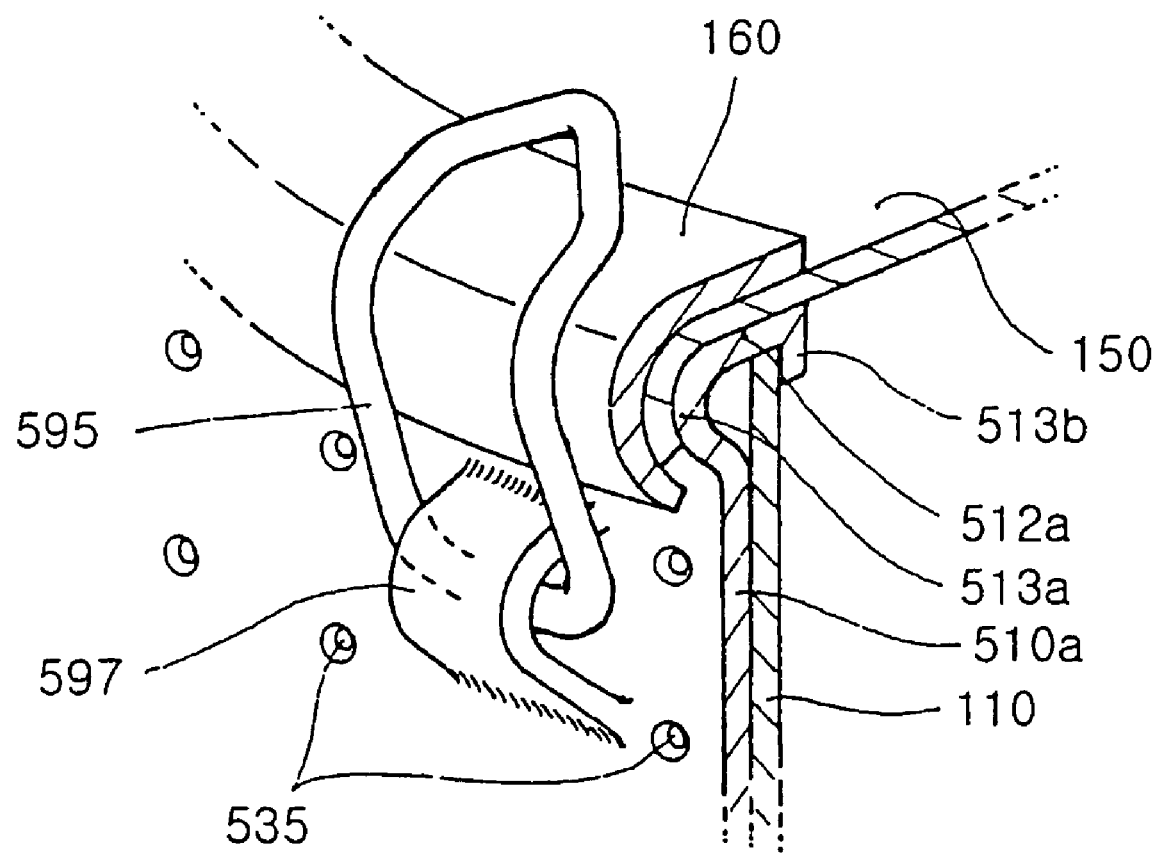
FIG. 23 is an exterior perspective view of a ring equipped in the welding wire container according to the fourth embodiment of the invention.
Figure 24A:
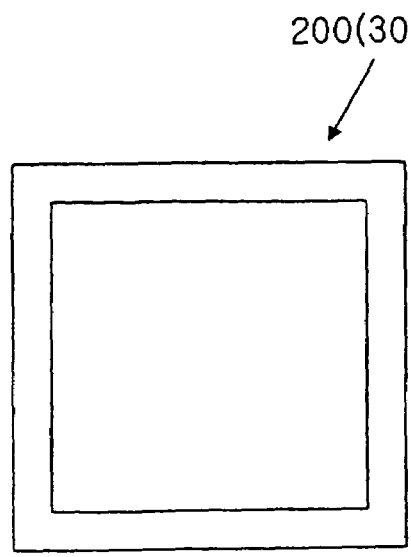
Figure 24B:
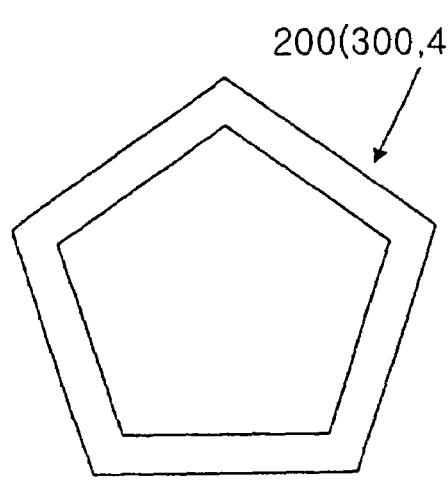
Figure 24C:
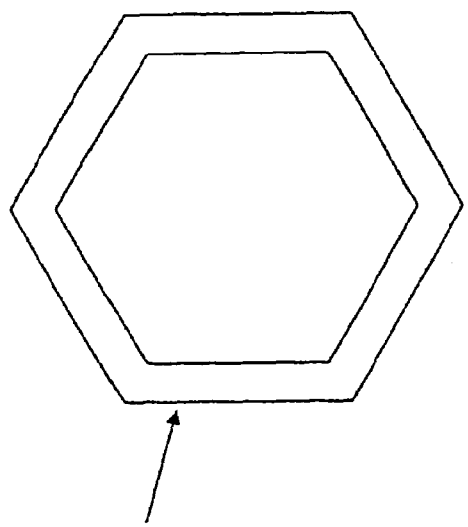
Figure 24D:
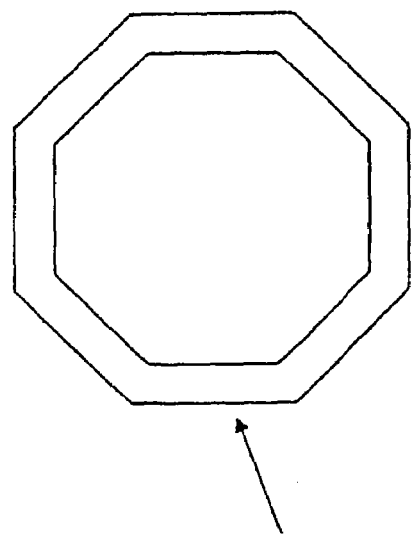

FIG. 23 shows a ring 595 mounted on the welding wire container 500 according to the fourth embodiment of the invention. The ring 595 is fixed to the upper fixture 510a, which is incised in part to form a ring mounting frame 597 by which the ring 595 is connected to the upper fixture 510.

Alternatively, a ring-mounting block (not shown) may be fixed to a side of the upper fixture 510a via welding so that the ring 595 may be rotatably mounted on the ring-mounting block. Otherwise, the ring-mounting block (not shown) may be fixed to a side of the upper fixture 510 via rivets and so on so that the ring 595 may be rotatably mounted on the ring-mounting block.

FIGS. 24a to 24d illustrate several alternative cross sections of the welding wire container of the invention.

That is to say, the outer shell 110, the inner shell 120, the base plate 120 and the upper and lower fixtures 230 and 307 mounted thereon have polygonal cross sections such as quadrangle, pentagon, hexagon and octagon, and thus can be manufactured into various configurations.

According to the various configurations as above, the welding wire container of the invention can be easily made of paper while minimizing the use of steel, and accordingly very easily discarded after exhaustion.

Further, the welding wire can be stacked in one of the welding wire containers according to the first to fourth embodiments of the invention to provide a welding wire package, which can be readily carried with the transport jig 450 or 480 and so on. Those components such as the head cap 238 can be mounted on the outer shell 110 to facilitate feeding of the welding wire thereby improving productivity in the welding operation.

INDUSTRIAL APPLICABILITY

According to the present invention as described hereinbefore, the outer shell 110, the inner shell 120, the base plate 120 and the upper and lower fixtures 230 and 307 are mostly formed of paper while application of steel is minimized so that the container can be readily discarded after exhaustion.

Furthermore, the present invention constructs the welding wire container to be readily coupled and disassembled so that the container is readily discarded/reused and wastes are reduced in volume and mass. Moreover, the welding wire container is provided in an environment-friendly manner.

The invention claimed is:

1. A welding wire container which includes an outer shell for storing welding wire W therein, a base plate for closing a lower end of the outer shell and a lid for covering the outer shell, the welding wire container comprising:
   a fitting projection arranged in a lower inner portion of the outer shell and having a diameter smaller than that of the base plate for catching and supporting the base plate thereon; and
   a lower fixture for wrapping the lower end of the outer shell to structurally reinforce the same, wherein the lower fixture includes a flange extending along a lower edge of the outer shell and a supporting face folded from the flange and extending along a lower outer periphery of the outer shell; and
   a backing member made of steel and mounted on an inner portion of the fitting projection,
   wherein the backing member includes:
   a body extending along an inner periphery of the fitting protection, the body having a number of holes perforated from an inner face thereof toward an outer face thereof and projected burrs;
   a flange folded from the body and extending along an outer edge of the base plate;
   cut sections formed at the body and the flange in a radial direction of the outer shell; and
   a diameter-adjusting means arranged at both ends of the body and the flange, whereby the backing member is adjusted in diameter.

2. The welding wire container in accordance with claim 1, wherein the fitting projection includes a lower end portion of the outer shell which is folded inward into an L-shape.

3. The welding wire container in accordance with claim 1, wherein the fitting projection includes a folded portion which is overlapped to have an outside diameter substantially identical with the inside diameter of the lower end of the outer shell.

4. The welding wire container in accordance with claim 1, wherein the fitting projection includes a ring member having an outside diameter substantially identical with the inside diameter of the lower end of the outer shell, the ring member being fixedly bonded to the lower inner portion of the outer shell.

5. The welding wire container in accordance with claim 1, wherein the fitting protrusion includes a steel backing member extending along a lower inner periphery of the outer shell and tightly fixed thereto, wherein the backing member includes an outer vertical portion extending along the lower inner periphery of the outer shell, the vertical portion having a number of holes perforated from an inner face toward an outer face and burrs projected thereon, and a flange folded from the outer vertical portion and extending along an outer edge of the base plate.

6. The welding wire container in accordance with claim 1, wherein the fitting projection includes a folded portion reduced in diameter adjacent to the lower end of the outer shell.

7. The welding wire container in accordance with claim 1, wherein the outer shell, the base plate and the lower fixture are made of paper.

8. The welding wire container in accordance with claim 1, wherein the outer shell includes an outer protrusion enlarged in diameter adjacent to a lower end of an upper fixture.

9. The welding wire container in accordance with claim 8, wherein the outer protrusion includes a folded portion enlarged in diameter beyond the outer shell adjacent to the lower end of the upper fixture.

10. The welding wire container in accordance with claim 8, wherein the outer protrusion includes a ring member which is enlarged in diameter adjacent to the lower end of the upper fixture, the ring member being fitted around and fixedly bonded to the outer shell.

11. The welding wire container in accordance with claim 1, further comprising an inner shell coaxially arranged in a central portion of the outer shell, wherein the inner shell is fixed at a lower end thereof to the base plate and folded inward at an upper end thereof to form a folded portion for structurally reinforcing the upper end.

12. The welding wire container in accordance with claim 1, wherein the base plate includes an underlying circular backing member fixed thereto, the backing member having an outer periphery corresponding to an inner periphery of the fitting projection for structurally reinforcing the lower inner portion of the outer shell.

13. The welding wire container in accordance with claim 1, wherein the diameter-adjusting means includes:
   nut members mounted on the body in an inner periphery thereof adjacent to the cut sections; and a bolt member having male threads at both ends for screwing into the nut members, wherein rotation of the bolt member enlarges the diameter of the body so that an outer periphery of the backing member closely contacts with the lower inner periphery of the outer shell, whereby the backing member more securely supports the lower end of the outer shell against external force.

14. The welding wire container in accordance with claim 1, wherein the lower fixture includes clamping means at end sections cut along a radial direction of the outer shell, wherein the clamping means tightens the lower end of the outer shell so that the base plate and the fitting projection of the outer shell closely contact with each other.

15. The welding wire container in accordance with claim 14, wherein the supporting face of the lower fixture has a number of holes perforated from an outer face toward an inner face and burrs projected around the holes for fixedly pressing the outer periphery of the outer shell.

16. The welding wire container in accordance with claim 14, wherein the clamping means includes a clamp, wherein the clamp has:

a handle rotatably mounted on one end of the supporting face;

a hook arranged in a middle portion of the handle; and a protrusion arranged at the other end of the supporting face and adapted to catch the hook, whereby the handle is flapped toward the protrusion, the hook is hung around the protrusion, and then the handle is flapped away from the protrusion allowing the hook to pull the protrusion so that the ends of the supporting face are strongly connected to each other via the hook and the protrusion.

17. A welding wire container formed of paper and including an outer shell for storing welding wire W therein and a base plate for closing a lower end of the outer shell, the welding wire container comprising:

an upper protrusion integrally formed with the outer shell and enlarged in diameter beyond the outer shell for structurally reinforcing an upper outer portion of the outer shell;

a lid sized for covering the outer shell;

an upper fixture formed as an integral and endless ring structure for fixing and wrapping the lid at an upper end of the outer shell to obtain structural reinforcement, wherein the upper fixture includes a flange extending inward along an outer edge of the lid, a supporting face folded from the flange and extending along an outer periphery of the upper protrusion and a folded groove arranged under the supporting face and having a diameter smaller than that of the upper protrusion;

a fitting projection arranged in a lower inner portion of the outer shell and having a diameter smaller than that of the base plate for catching and supporting the base plate thereon; and a lower fixture for wrapping the lower end of the outer shell to structurally reinforce the same, wherein the lower fixture includes a flange extending along a lower edge of the outer shell and a supporting face folded from the flange and extending along a lower outer periphery of the outer shell.

* * * * *

UNITED STATES PATENT AND TRADEMARK OFFICE
CERTIFICATE OF CORRECTION

PATENT NO.        : 7,325,683 B2                                    Page 1 of 1
APPLICATION NO.   : 10/518451
DATED             : February 5, 2008
INVENTOR(S)       : Hyo-Young Bae et al.

It is certified that error appears in the above-identified patent and that said Letters Patent is hereby corrected as shown below:

Column 15, Line 65, Claim 1, "protection," should read -- projection, --

Signed and Sealed this

First Day of July, 2008

JON W. DUDAS
*Director of the United States Patent and Trademark Office*